(12) United States Patent  
Seigler et al.

(10) Patent No.: US 7,500,255 B2  
(45) Date of Patent: Mar. 3, 2009

(54) DATA WRITING WITH PLASMON RESONATOR

(75) Inventors: Michael Allen Seigler, Pittsburgh, PA (US); Thomas William Clinton, Pittsburgh, PA (US); Mark William Covington, Pittsburgh, PA (US); Christophe Daniel Mihalcea, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 689 days.

(21) Appl. No.: 10/879,447

(22) Filed: Jun. 29, 2004

(65) Prior Publication Data

US 2005/0289577 A1    Dec. 29, 2005

(51) Int. Cl.  
*G11B 11/00* (2006.01)

(52) U.S. Cl. .................................................. 720/658

(58) Field of Classification Search .............. None  
See application file for complete search history.

(56) References Cited

U.S. PATENT DOCUMENTS

| | | | |
|---|---|---|---|
| 2003/0112542 A1* | 6/2003 | Rettner et al. | 360/59 |
| 2003/0128633 A1 | 7/2003 | Batra et al. | 369/13.32 |
| 2003/0128634 A1 | 7/2003 | Challener | 369/13.33 |
| 2003/0137772 A1 | 7/2003 | Challener | 360/131 |
| 2004/0001394 A1 | 1/2004 | Challener et al. | 369/13.32 |
| 2004/0062503 A1* | 4/2004 | Challener | 385/129 |
| 2005/0078565 A1* | 4/2005 | Peng et al. | 369/13.32 |
| 2006/0083116 A1* | 4/2006 | Rottmayer et al. | 369/13.02 |

* cited by examiner

*Primary Examiner*—Mark Blouin  
(74) *Attorney, Agent, or Firm*—Westman, Champlin & Kelly, P.A.

(57) ABSTRACT

A data writing system includes an array of cells for storing data and a write transducer that moves over a selected cell in the array of cells. The write transducer includes a writer producing a write magnetic field that intersects the selected cell. The write transducer also includes a plasmon resonator that is adjacent the writer. The plasmon resonator is shaped to receive lower power density radiation and to provide plasmon radiation at a higher power density to an optical spot intersecting with the selected cell. The plasmon radiation heats the selected cell above a write temperature.

16 Claims, 15 Drawing Sheets

DATA WRITING WITH PLASMON RESONATOR

STATEMENT REGARDING FEDERALLY SPONSORED RESEARCH OR DEVELOPMENT

This invention was made with United States Government support under Agreement No. 70NANB1H13056 awarded by the National Institute of Standards and Technology (NIST). The United States government has certain rights in the invention.

FIELD OF THE INVENTION

The present invention relates generally to data storage systems, and more particularly, but not by limitation, to disc drives.

BACKGROUND OF THE INVENTION

As areal densities increase, smaller bit cells are required in the magnetic media (track width and bit length). As the size of the bit cells becomes smaller, the bit cells become increasingly susceptible to thermal energy flipping the bit cell (i.e., changing the magnetization of the bit cell) and creating an error. Materials and processing of the bit cells can be altered to increase the coercivity of the bit cells to a level high enough to avoid thermal errors. When this is done however, the coercivity becomes so high that it becomes difficult to design a write head that will produce a high enough magnetic field to flip a selected bit cell without also inadvertently flipping adjacent bit cells, resulting in errors.

A data writing system is needed that includes high density cells that are resistant to thermal flipping and in which a single cell can be accessed for writing without inadvertently flipping adjacent cells. A write transducer is needed that provides high levels of write magnetic fields for such high density cells. Embodiments of the present invention provide solutions to these and other problems, and offer other advantages over the prior art.

SUMMARY OF THE INVENTION

Disclosed is a data writing system comprising a medium including an array of cells for storing data. The data writing system also includes a write transducer that is moveable relative to the medium to provide a movement of the write transducer over a selected cell in the array.

The write transducer comprises a writer producing a write magnetic field that intersects the selected cell. The write transducer includes a bearing surface. The write transducer also comprises a plasmon resonator that is adjacent the writer. The plasmon resonator is shaped to receive lower power density radiation and to provide plasmon radiation at a higher power density to an optical spot intersecting with the selected cell. The plasmon radiation heats the selected cell above a write temperature.

In one preferred arrangement, the writer comprises an electrical conductor adjacent the bearing surface for carrying a write current, and the write current produces a write magnetic field that intersects the selected cell.

In another preferred arrangement, the writer comprises a write coil and a write core including a write gap, and the plasmon resonator includes a pin that passes through the write gap at the bearing surface.

Other features and benefits that characterize embodiments of the present invention will be apparent upon reading the following detailed description and review of the associated drawings.

DETAILED DESCRIPTION OF ILLUSTRATIVE EMBODIMENTS

Disclosed is a data writing system that includes a write transducer that can write data to selected individual cells in an array on a storage medium. The write transducer includes a writer that produces a write magnetic field. The write transducer also includes a plasmon resonator that provides high density optical radiation to an optical spot on the individual cell. The high density optical radiation heats a selected cell to reduce its coercivity to a lower level so that data can be written to the cell. The cell rapidly cools, increasing its coercivity to a high level where it cannot be inadvertently flipped by thermal energy.

The data writing system includes high density cells that are resistant to thermal flipping and in which a single cell can be accessed for writing without inadvertently flipping adjacent cells. The write transducer provides high levels of write magnetic fields for writing to such high density cells.

In order to keep the signal-to-noise ratio (SNR) at a suitable level, the number of grains in the media per bit cell must not decrease too rapidly (assuming the system is media noise limited). Therefore, the media grain size needs to decrease in size as the bit cell size decreases. The thermal stability of the media can be given as the ratio $K_u V / K_B T$, where $K_u$ is the uniaxial anisotropy in the media grain, V is the volume of the grain, $K_B$ is the Boltzmann's constant and T is temperature of the grain. If this ratio becomes too small, thermal energy becomes large enough to flip the magnetization of the media grain. If the media grain magnetization flips, the data is lost and this is referred to as thermally unstable media. As the bit cell and media grain become smaller, the volume of the grain becomes smaller and the media becomes less thermally stable. One way of keeping the thermal stability ratio $K_u V/K_B T$ large enough is to increase $K_u$. As $K_u$ of the media increase, the coercivity of the media also tends to increase. If the coercivity increases, larger fields are needed from the write head to write data to the media. Larger write fields are generally achieved by using materials with a larger saturation magnetization (Ms) as the pole material. Finding a high moment material (HMM) with an Ms larger than the 2.45 T of $Fe_{50}Co_{50}$, which is currently being used in some write heads, is proving to be very difficult if not impossible. An alternative to finding larger Ms write materials is to heat the media to lower its thermal stability (by lowering $K_u$) while applying a write field. This is described below by way of examples in FIGS. 1-13.

Figure 1:
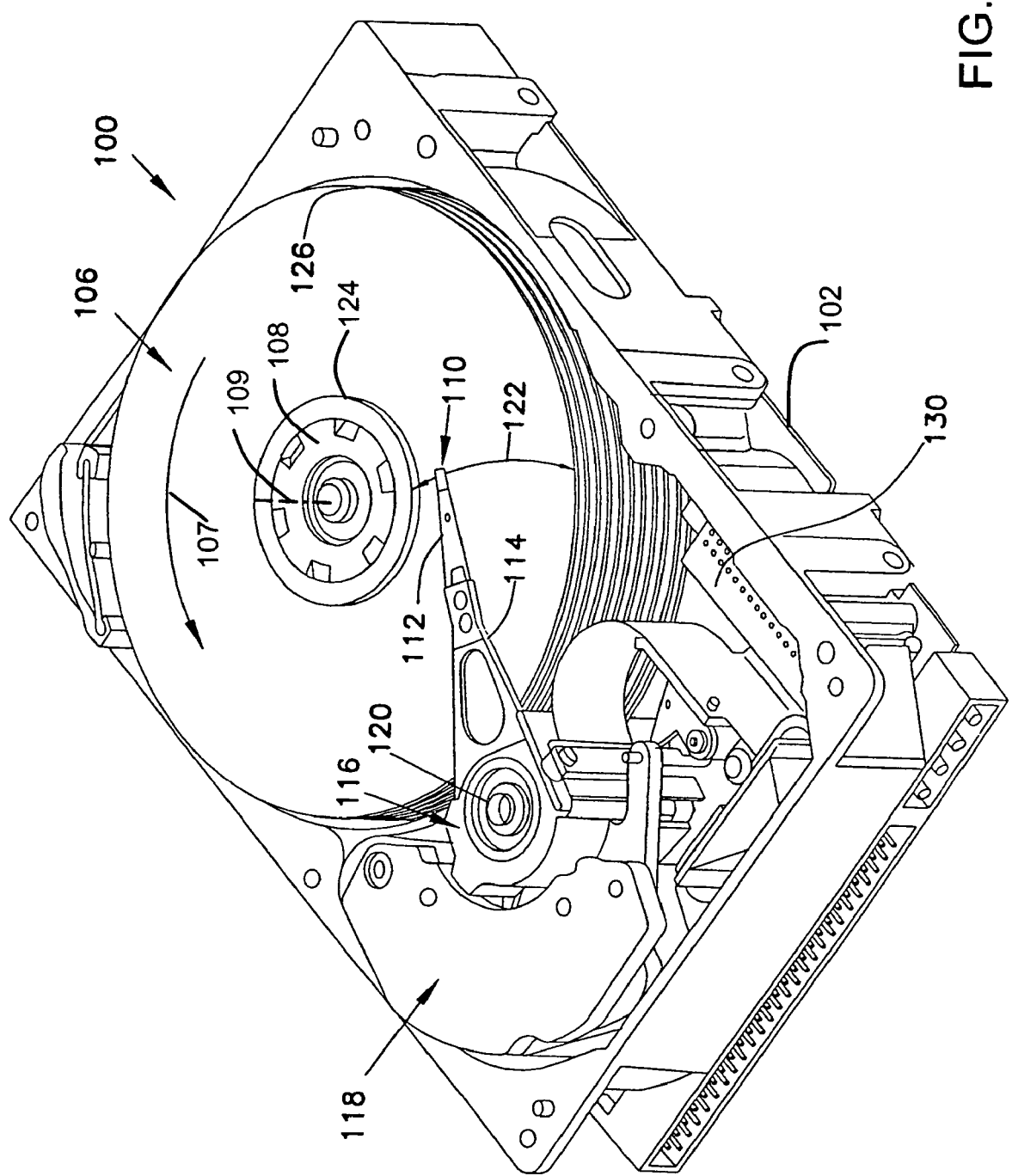
FIG. 1 illustrates an oblique view of a disc drive.

FIG. 1 illustrates an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction indicated by arrow 107 about central axis 109. Each disc surface has an associated disc read/write head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached read/write heads 110 about a pivot shaft 120 to position read/write heads 110 over a desired data track along an arcuate path 122 between a disc inner diameter 124 and a disc outer diameter 126. Voice coil motor 118 is driven by electronics 130 based on signals generated by read/write heads 110 and a host computer (not shown). The individual discs in the disc pack 106 are formatted with an array of data storage cells for storing data. The read/write head slider 110 includes a data writing system that is described in more detail below by way of examples illustrated in FIGS. 2A,B-13.

Figure 2A:
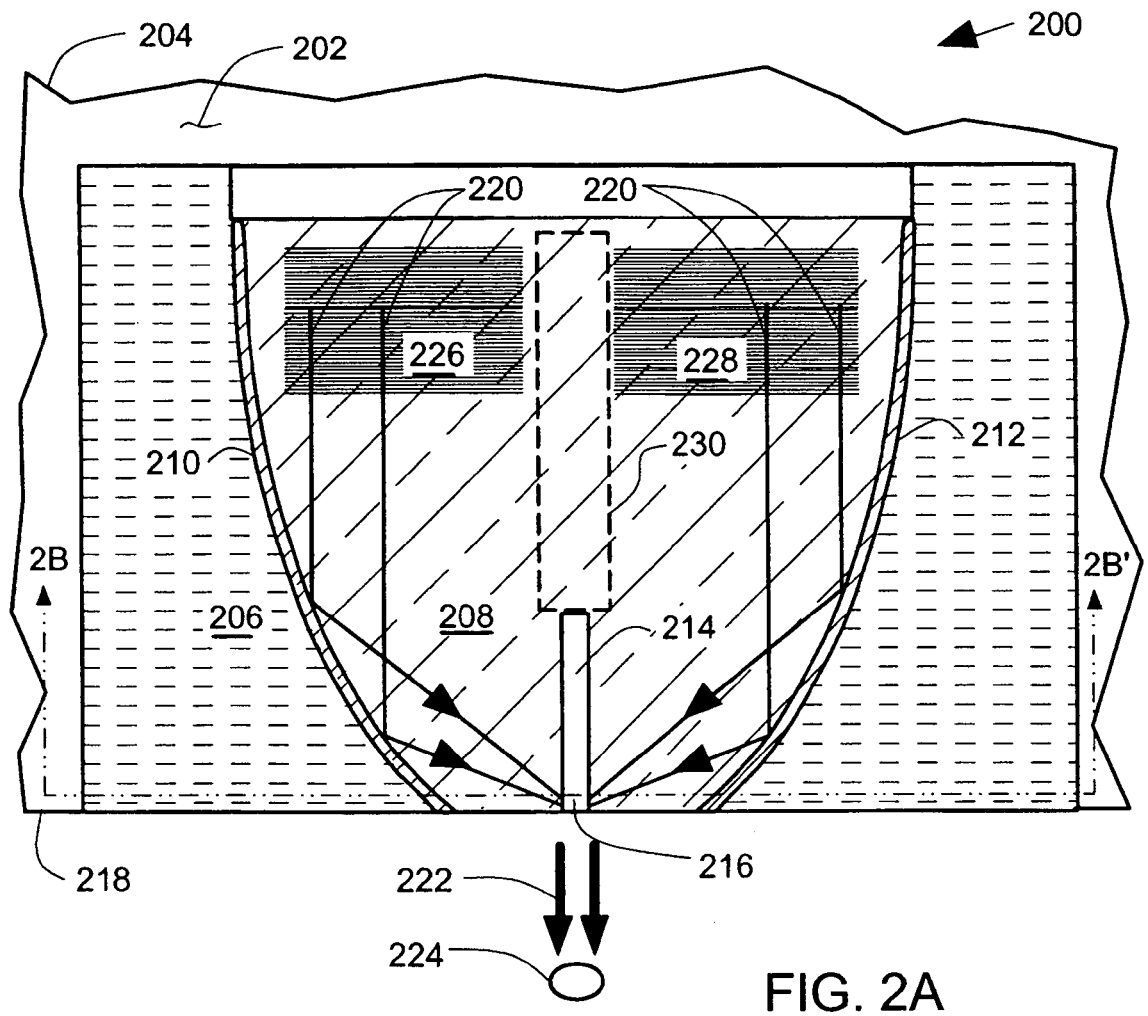
FIGS. 2A, 2B illustrates a first embodiment of a plasmon resonator.
Figure 2B:
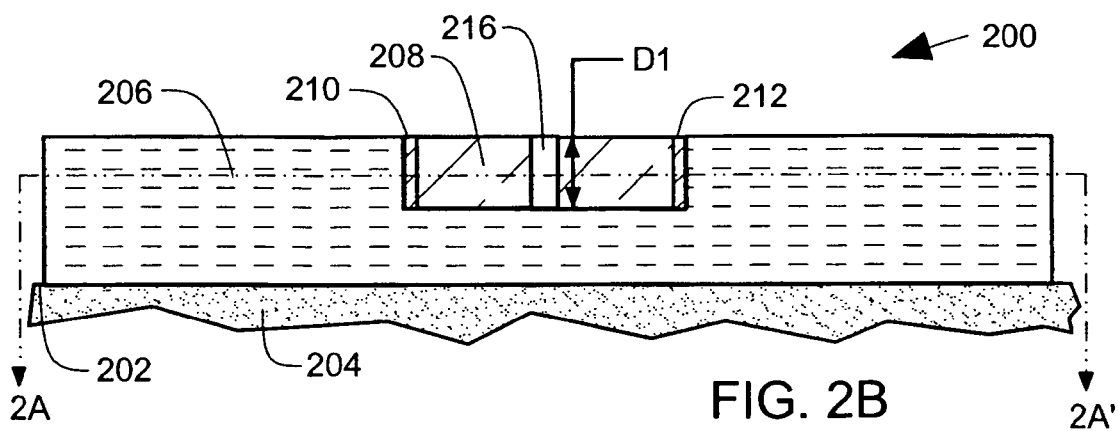

FIGS. 2A, 2B illustrate a first embodiment of a plasmon resonator 200 that can be deposited, for example, along a trailing side 202 of a slider substrate 204. FIG. 2A illustrates a front cross sectional view along a line 2A-2A' in FIG. 2B. FIG. 2B illustrates a bottom cross sectional view along a line 2B-2B' in FIG. 2A.

The plasmon resonator 200 includes a first deposit 206 of a first dielectric material with a lower optical index of refraction, and a second deposit 208 of a second dielectric material with a higher optical index of refraction. The first deposit 206 and the second deposit 208 are thin film layers that abut one another along reflective surfaces 210, 212. The reflective surfaces 210, 212 have shapes that preferably comprise portions of a parabola. The reflective surfaces 210, 212 can comprise a metal reflective layer as illustrated, or can alternatively rely on the differences in optical index of refraction to provide reflection. This reflector arrangement is referred to here as an immersion mirror.

Optical gratings 226, 228 are positioned in the second deposit 208 so that lower power density radiation 220 from the optical gratings 226, 228 illuminates the reflective layers 210, 212. The optical gratings 226, 228 are preferably illuminated obliquely as described below in connection with FIG. 12. The term "power density" is used here to refer to an amount of power per unit area impinging on a mathematical surface transverse to a direction of propagation. The optical gratings 226, 228 are used to couple the lower power density radiation 220 from an external source into the waveguide formed of the second deposit material 208. In a preferred embodiment, the gratings 226, 228 may be offset to give a desired polarization orientation and thus provide constructive optical interference at a metal pin 214. A dead region 230 in the layer 208 does not carry radiation. The layer 208 can be discontinuous in the dead region 230, if desired, to allow other head structures, such as electrical leads or magnetic cores, to pass through discontinuities at the center of the device 200.

The metal pin 214 is embedded in the second deposit 208 generally along a central axis of the parabola defined by the reflective surfaces 210, 212. A lower end 216 of the metal pin 214 is generally coplanar with a bearing surface 218 of the slider substrate 204. The lower end 216 is also generally at a focal point of the parabola. The lower end 216 is positioned so that the reflective surfaces 210, 212 can focus radiation on the lower end 216. The metal pin 214 has a dimension D1 that is on the order of about one hundred nanometers or less. Input radiation 220 is provided to device 200 by a light source mounted in a position to illuminate the gratings 226, 228 at an oblique angle, for example, as described below in connection with FIG. 12.

The term "bearing surface" as used in this application means a surface geometry that faces a recording media surface. The term "bearing surface" as used in this application can comprise an air bearing surface, a direct contact surface or a pseudo-contact surface.

When input radiation 220, that has a relatively lower power density, is focused on the lower end 216, waves called surface plasmons are formed on outer surfaces of the metal pin 214. In a preferred arrangement, the pin 214 comprises a deposit of gold. When the wavelength of the radiation resonates with a plasmon resonant frequency of the metal pin 214, the plasmons generate an output plasmon radiation 222 at a higher power density. The arrangement works to greatly focus or concentrate radiation to an extremely small optical spot 224. The size of the optical spot is controlled by the dimension D1 of the metal pin 214. Because of the small dimension of the pin, a spot size is realized that is smaller than the spot size that could be realized using conventional diffraction methods. The concentrating ability of the plasmon action on metal pin 214 is combined with the concentrating ability of the parabolic reflections from reflective surfaces 210, 212 to provide high power density at the optical spot 224 for heating a data storage cell in an array on a magnetic medium as described below in connection with examples illustrated in FIGS. 3-11. The spot size is preferably smaller than a diffraction limit. The spot size is preferably smaller than 100 nanometers.

When the pin 214 is held in close proximity to magnetic media, high power density light 222 is coupled to and absorbed by the magnetic media, thus raising the temperature of the media. The arrangement shown in FIGS. 2A-2B is referred to here as a solid immersion mirror with a pin (SIMP). The plasmon resonator 200 is shaped to receive lower power density radiation and to provide plasmon radiation at a higher power density to an optical spot 224. The higher power density radiation has a magnitude sufficient to heat a magnetic data storage cell to a temperature that is above a write temperature of the magnetic data storage cell. The plasmon resonator 200 can be adapted for use in data writing systems as described below in connection with FIGS. 3-11.

Figure 2C:
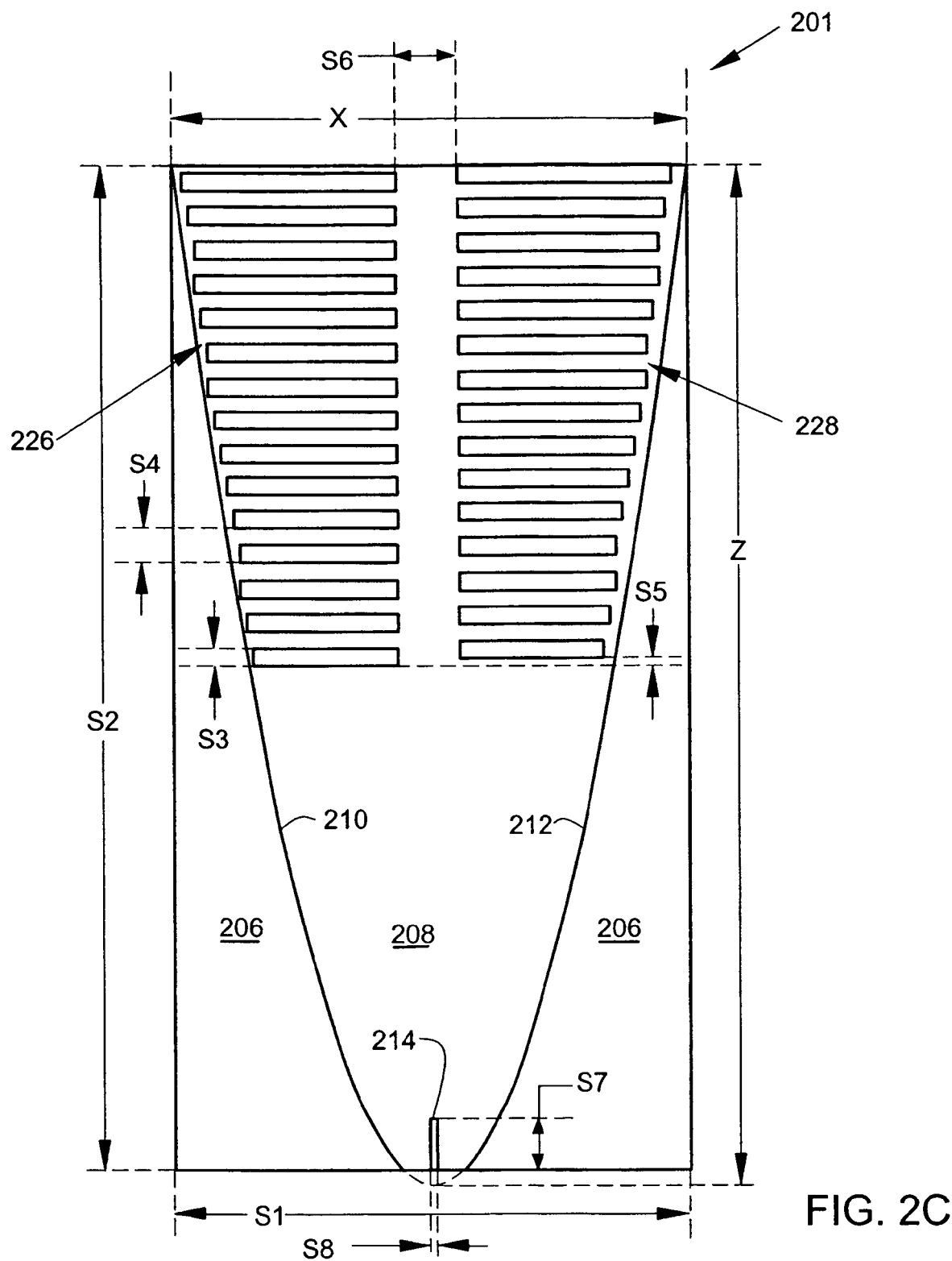
FIG. 2C illustrates a second embodiment of a plasmon resonator.

FIG. 2C illustrates a second embodiment of a plasmon resonator 201. The plasmon resonator 201 is similar to the plasmon resonator 200 illustrated in FIGS. 2A-2B. Reference numbers used in FIG. 2C that are the same as reference numbers used in FIGS. 2A-B identify the same or similar features. The plasmon resonator 201 operates at an optical wavelength of 633 nanometers. In FIG. 2C, a first deposit 206 of dielectric material has a width S1 of about 50 micrometers and a height S2 of about 100 micrometers. In FIG. 2C, A second deposit 208 of dielectric material comprises tantalum pentoxide ($Ta_2O_5$) and has reflective surfaces 210, 212 that have a parabolic shape that has a height Z and a width X that are approximated by the equation $Z=(0.162)X^2-\frac{1}{4}(0.162)$.

In FIG. 2C, gratings 226, 228 have a depth S3 of approximately 50 nanometers and a pitch (period) S4 of approximately 834 nanometers. The gratings 226 are vertically offset from the gratings 228 by a height S5 of approximately 415 nanometers. The gratings 226 are horizontally separated from the gratings 228 by a spacing S6 of approximately 6 micrometers.

In FIG. 2C, the pin 214 is formed of gold and has a vertical height S7 of approximately 0.25 micrometers and a horizontal width S8 of approximately 50 nanometers.

Figure 3A:
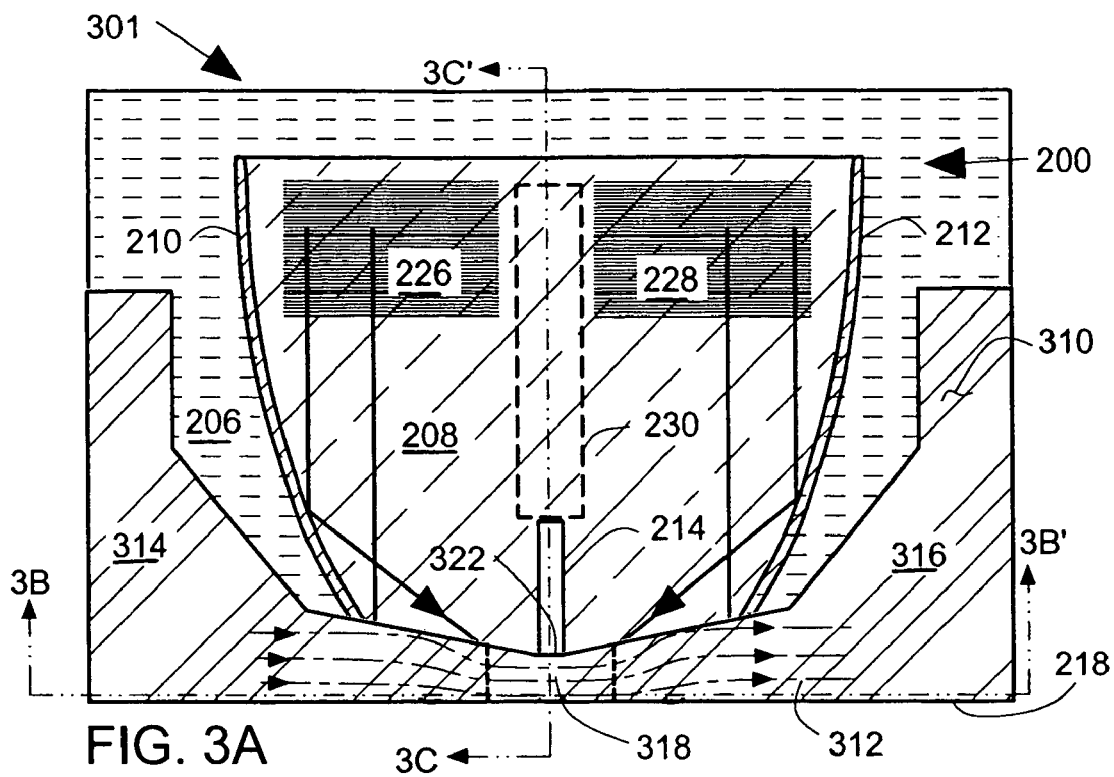
FIGS. 3A, 3B, 3C illustrate a first embodiment of a data writing system that includes a plasmon resonator.
Figure 3B:
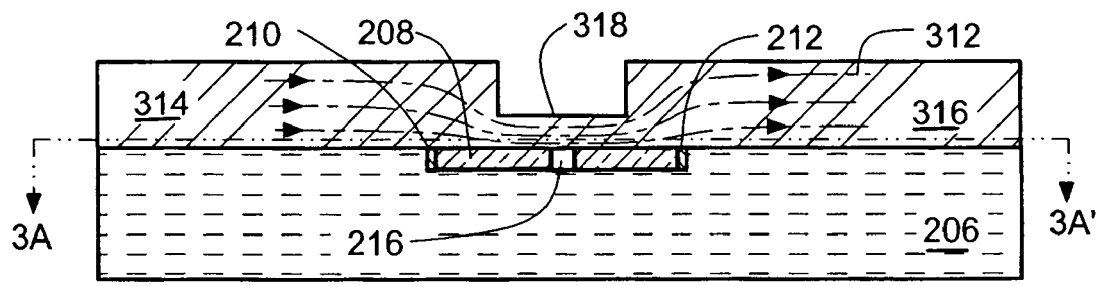
Figure 3C:
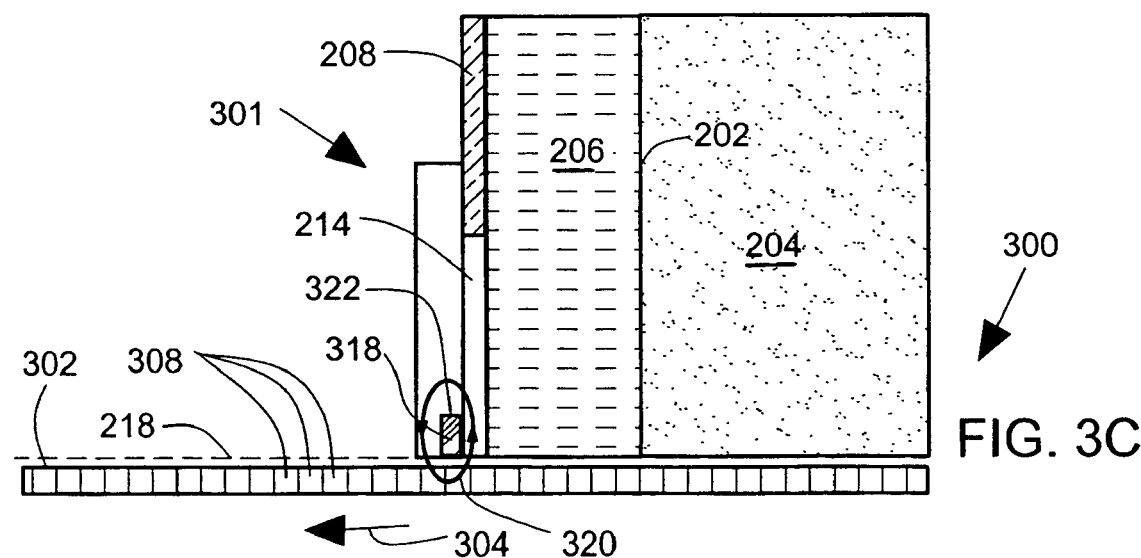

FIGS. 3A, 3B, 3C illustrate a first embodiment of a write transducer 301 that includes a plasmon resonator similar to the plasmon resonator 200 illustrated in FIGS. 2A-2B. Reference numbers used in FIGS. 3A, 3B, 3C that are the same as reference numbers used in FIGS. 2A, 2B refer to the same or similar features. FIG. 3A illustrates the write transducer 301, in a front view, generally along line 3A-3A' in FIG. 3B. FIG. 3B illustrates the write transducer 301, in a bottom cross-sectional view generally along line 3B-3B' in FIG. 3A. FIG. 3C illustrates the write transducer 301, in a side cross-sectional view generally along line 3C-3C' in FIG. 3A. In addition, FIG. 3C also illustrates a cross sectional view of an array of cells 308 for data storage in a magnetic storage medium 302. The magnetic storage medium 302 is spaced apart from a bearing surface 218 by a fly height. The write transducer 301 and the data storage medium 302 together comprise a data writing system 300. The medium 302 moves in a direction indicated by arrow 304. The cells 308 preferably comprise a magnetic material having a level of magnetic coercivity that is higher than a level of a write magnetic field 320 when the cells 308 are allowed to cool below a write temperature. The level of magnetic coercivity decreases to a level below the level of the write magnetic field 320 when the cells 308 are heated above the write temperature. The small spot size 224 (FIG. 2A) has a size that is near the size of a single cell 308, which allows selection of a single cell for writing by heating one selected cell 308 above the write temperature, while adjacent cells surrounding the selected cell remain below the write temperature.

The write transducer 301 includes the features of the plasmon resonator 200 and also includes an electrically conducting layer 310 that is deposited over portions of the deposits 206, 208 and the pin 214. The electrically conducting layer 310 conducts a write current indicated by arrows 312. The electrically conducting layer 310 includes contact and lead regions 314, 316 that are relatively wide (as illustrated in FIG. 3A) and relatively thick (as illustrated in FIG. 3B). providing a larger surface area transverse to the direction of current flow.

The electrically conducting layer 310 also includes a thinned region 318 that overlies the pin 214. The thinned region 318 is an electrical conductor. In comparison to the regions 314, 316, the thinned region 318 is relatively narrow (as illustrated in FIG. 3A) and also relatively thin (as illustrated in FIG. 3B). A write current density in the contact and lead regions 314, 316 is relatively low, and a write current density in the thinned region 318 is relatively high. The arrangement of the thinned region 318 is referred to here as current-in-the-plane wire-assisted magnetic recording (CIP-WAMR). The magnetic recording can be arranged to be perpendicular or longitudinal, depending the needs of the application. The thinned region 318 produces the magnetic field 320 in the medium 302 that is used to write data and is also referred to as a writer 318.

The relatively high current density in the thinned region (electrical conductor) 318 provides the large magnetic field 320 (FIG. 3C) in the cells 308 near the time that each cell 308 lies under the pin 214 as the media 302 flies by the head 306. The plasmon radiation from the pin 214 heats an underlying cell 308 above a write temperature. The thinned region 318 ("wire") preferably has a very small height (distance from the bearing surface 218 to the back edge of the wire 322), reducing any undesirable effect on the plasmon field on the surface of the pin 214. The narrowed region 318 delivers the large write magnetic field 320 to a volume in the media 302 that is coincident with the heat profile created in the media by the light delivery system without disturbing the operation of the light delivery system.

The write current 312 is applied while the underlying cell is still above the write temperature. The write magnetic field 320 writes data to the cell that is heated. After the underlying cell passes by the narrowed region 318, it cools quickly and is immune to rewriting by stray magnetic fields after it cools. The magnetic field 320 can partially intersect (spill over into) adjacent cells that are not heated without writing to those adjacent cells. Only a single cell 308 that is heated by the plasmon radiation while the magnetic field 320 is present is written to. The array of cells 308 comprises a magnetic material having a magnetic coercivity that is above the level of the write magnetic field below the write temperature, and that decreases to a level below the level of the write magnetic field when heated above the write temperature.

This arrangement allows for writing to cells 308 that are packed with a density that is higher than the density that could be achieved without the use of plasmon heating. A larger amount of data can be stored in a physically smaller storage medium using the arrangement shown in FIGS. 3A-3B.

In a preferred arrangement, the array of cells comprises a material that, below the write temperature, has a magnetic coercivity above a selected level in the range of 1-2 Tesla. The array of cells preferably comprises a material that, above the write temperature, has a magnetic coercivity below the selected level in the range of 1-2 Tesla. The write transducer 301 is preferably moveable relative to the medium to provide a movement of the write transducer over a selected cell in the array. The write transducer comprises a writer 318 producing a write magnetic field that intersects the selected cell and a plasmon resonator 301 that is adjacent the writer 318. The plasmon resonator is preferably shaped to receive lower power density radiation and to provide plasmon radiation at a higher power density to an optical spot intersecting with the selected cell. The plasmon radiation heats the selected cell above a write temperature.

It will be understood by those skilled in the art that a cell is "selected" for writing when sufficiently high temperature and write magnetic field are both present in the selected cell at the same time. At any particular time, non-selected cells that are adjacent to the selected cell may have sufficiently high temperature (but not sufficiently high write magnetic field), or may have sufficiently high write magnetic field (but not sufficiently high temperature), so that writing to non-selected cells is inhibited. The dimensions and relative positions of the plasmon resonator and write poles can be designed to limit selection for writing to a single cell.

Figure 4A:
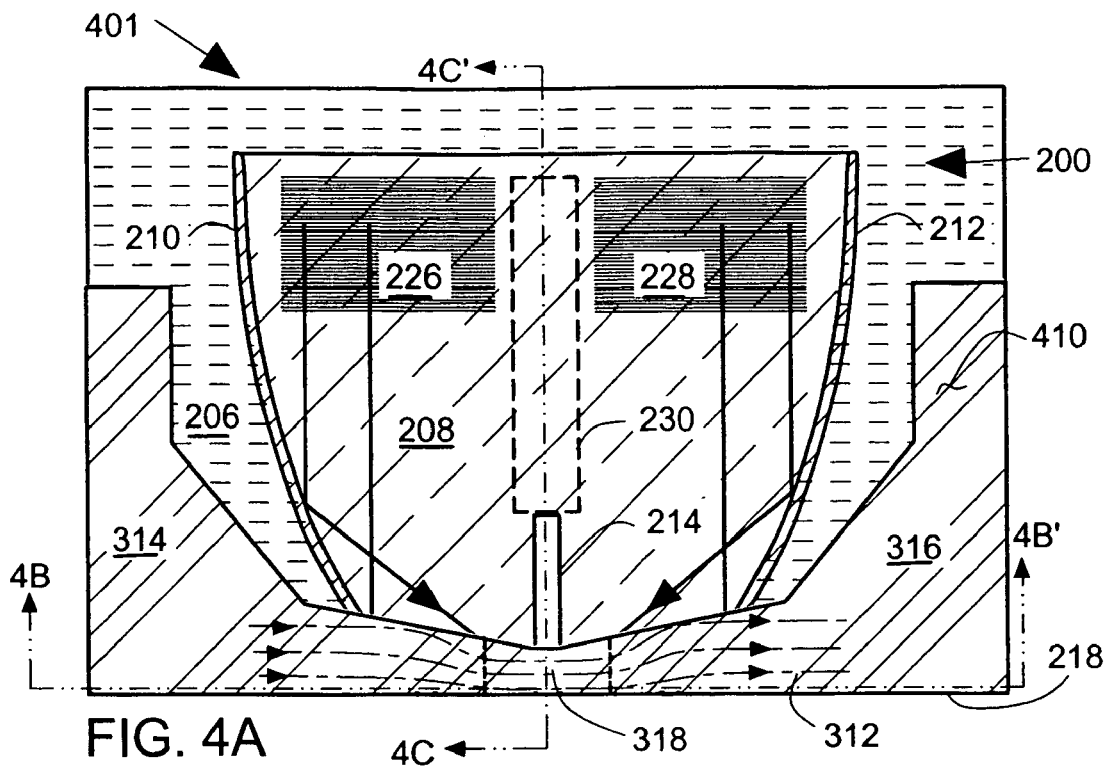
FIGS. 4A, 4B, 4C illustrate a second embodiment of a data writing system that includes a plasmon resonator.
Figure 4B:
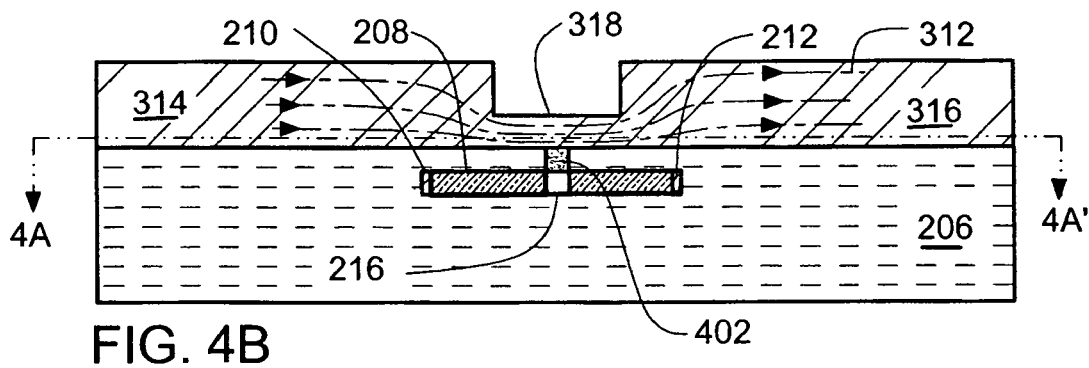
Figure 4C:
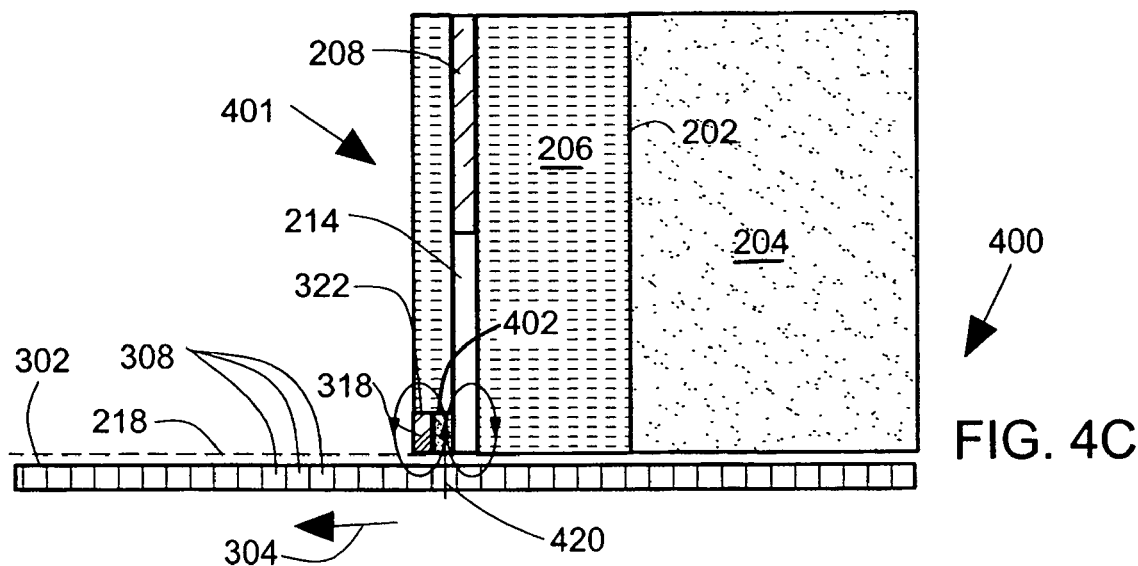

FIGS. 4A, 4B, 4C illustrate a second embodiment of a write transducer 401. The write transducer 401 includes a plasmon resonator similar to the plasmon resonator 200 illustrated in FIGS. 2A-2B. The write transducer 401 also includes an electrically conductive layer 410 that is similar to the electrically conductive layer 310 in FIGS. 3A, 3B, 3C and includes a thinned region (electrical conductor) 318. Reference numbers used in FIGS. 4A, 4B, 4C that are the same as reference numbers used in FIGS. 3A, 3B, 3C refer to the same or similar features. FIG. 4A illustrates a front view generally along line 4A-4A' in FIG. 4B. FIG. 4B illustrates a bottom cross-sectional view generally along line 4B-4B' in FIG. 4A. FIG. 4C illustrates a side cross-sectional view generally along line 4C-4C' in FIG. 4A.

The write transducer 401 includes a deposit of high magnetic moment material (HMM) 402 that is between the lower end 216 and the thinned region 318. The deposit of high magnetic moment material 402 is adjacent the current in plane current element 318. This arrangement is referred to here as a current-in-the-plane WAMR with a HMM pole (CIP-WAMR-HMM) field delivery with a SIMP light delivery system. In this configuration the high magnetic moment material 402 provides a vertical flux 420 that is driven by the current in the thinned region 318, resulting in the even larger vertical magnetic flux 420. Since the thinned region 318 and the high magnetic moment material 402 can be made with a very small height (distance from the ABS to the back edge 322), there is minimal effect on the plasmon in the pin. In other respects, a data writing system 400 shown in FIG. 4C is similar to the data writing system 300 shown in FIG. 3C.

Alternatively, the pin 214 in FIGS. 4A, 4B, 4C can be placed between the thinned region 318 and the HMM material 402 (not illustrated). This alternative operates in the same manner (flux from wire driving the HMM), but this would also collocate the largest field gradient and the pin, which is advantageous.

Figure 5A:
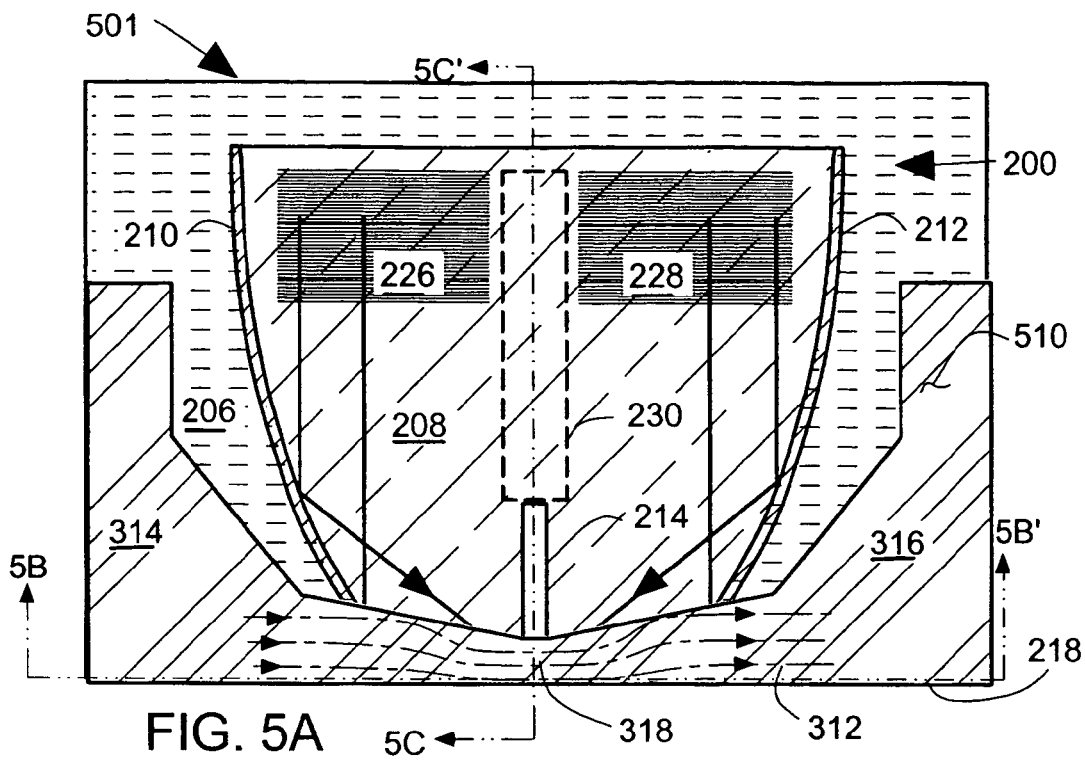
FIGS. 5A, 5B, 5C illustrate a third embodiment of a data writing system that includes a plasmon resonator.
Figure 5B:
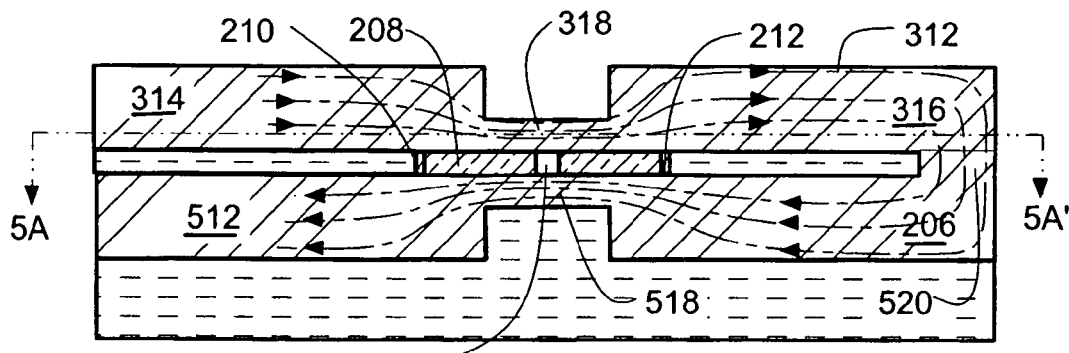
Figure 5C:
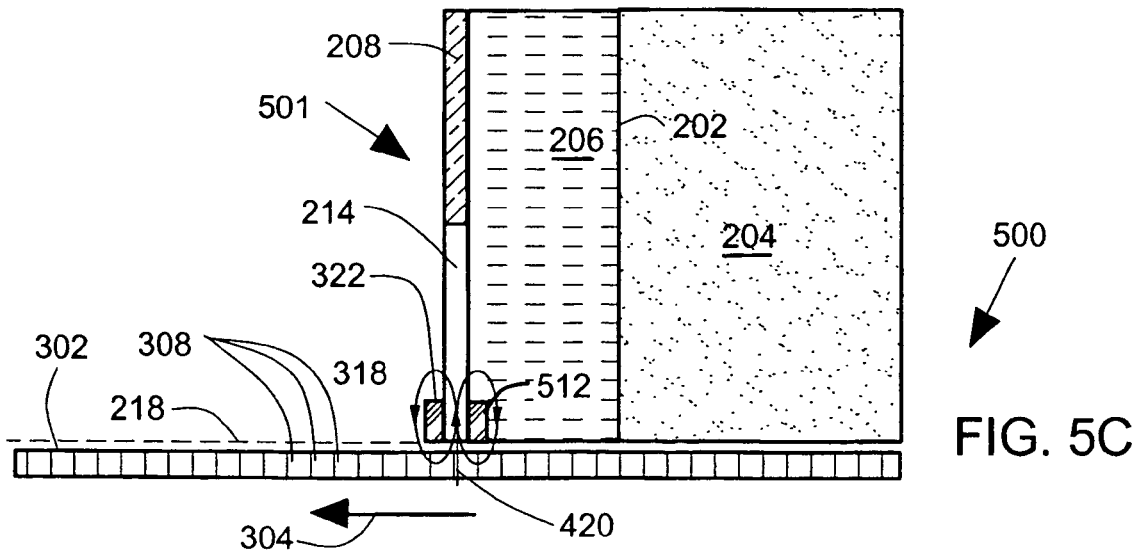

FIGS. 5A, 5B, 5C illustrate a third embodiment of a write transducer 501. The write transducer 501 includes a plasmon resonator 200 similar to the plasmon resonator 200 illustrated in FIGS. 2A-2B. Reference numbers used in FIGS. 5A, 5B, 5C that are the same as reference numbers used in FIGS. 3A, 3B, 3C refer to the same or similar features. FIG. 5A illustrates a front view generally along line 5A-5A' in FIG. 5B. FIG. 5B illustrates a bottom cross-sectional view generally along line 5B-5B' in FIG. 5A. FIG. 5C illustrates a side cross-sectional view generally along line 5C-5C' in FIG. 5A.

The write transducer 501 includes a first electrically conductive layer 510 that is similar to the electrically conductive layer 310 shown in FIGS. 3A, 3B, 3C. The write transducer 501 also includes a second electrically conductive layer 512 that is between the metal pin 214 and the substrate 204 as shown in FIG. 5C. In write transducer 501 there is a first thinned region 318 on one side of the lower end 216 and also a second thinned region (electrical conductor) 518 on an opposite side of the lower end 216. This arrangement is referred to here as a dual current-in-the-plane WAMR (dual CIP-WAMR) field delivery with a SIMP light delivery system. In this configuration there are multiple current in plane elements ("wires") 318, 518 on both sides of the lower end 216. The current 312 flows in opposite directions on opposite sides of the lower end 216 in order to increase the magnetic field directly under the lower end 216. The first and second thinned layers 318, 518 form a writer and are electrically connected at 520 to form a series electrical circuit. Thin insulating layers (not illustrated) electrically insulate the lower end 216 from the first and second thinned layers 318, 315 to prevent a short circuit. In an alternative embodiment, HMM layers (explained above in connection with FIGS. 4A, 4B, 4C) are inserted between the lower end 216 and each of the thinned regions 318, 518 to increase the field under the pin even further (not illustrated). In other respects, a data writing system 500 shown in FIG. 5C is similar to the data writing system 300.

Figure 6A:
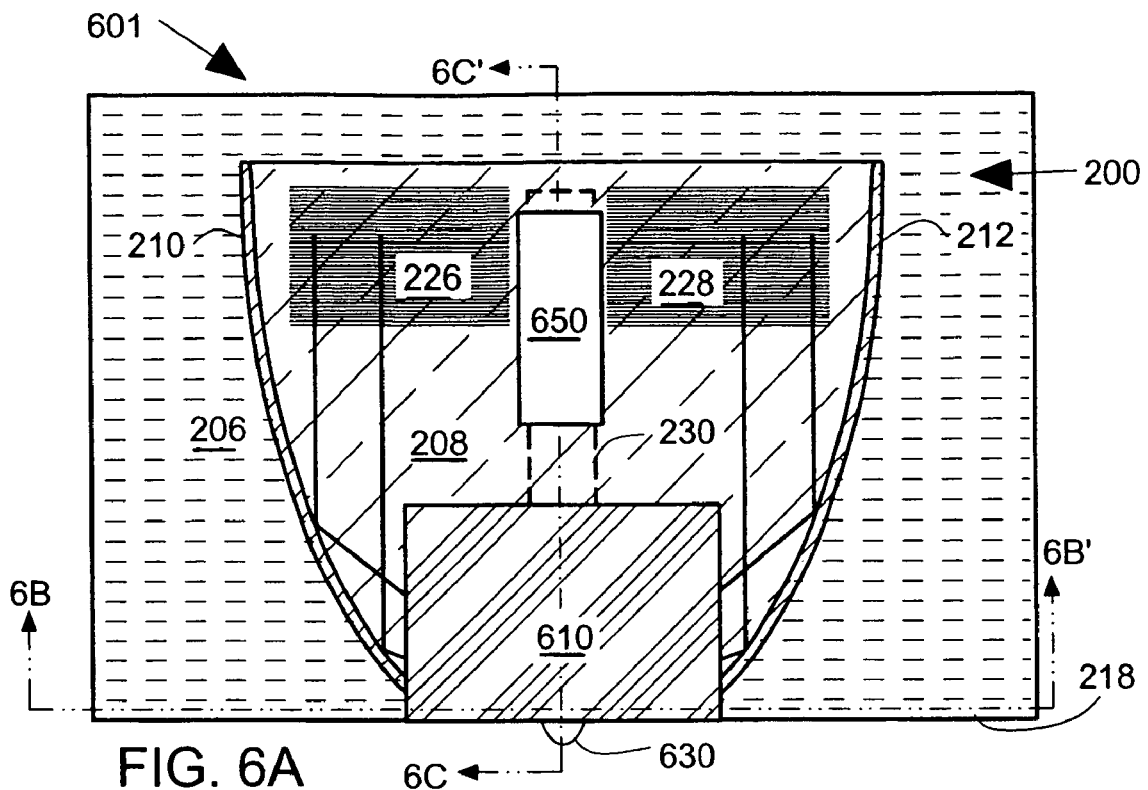
FIGS. 6A, 6B, 6C illustrate a fourth embodiment of a data writing system that includes a plasmon resonator.
Figure 6B:
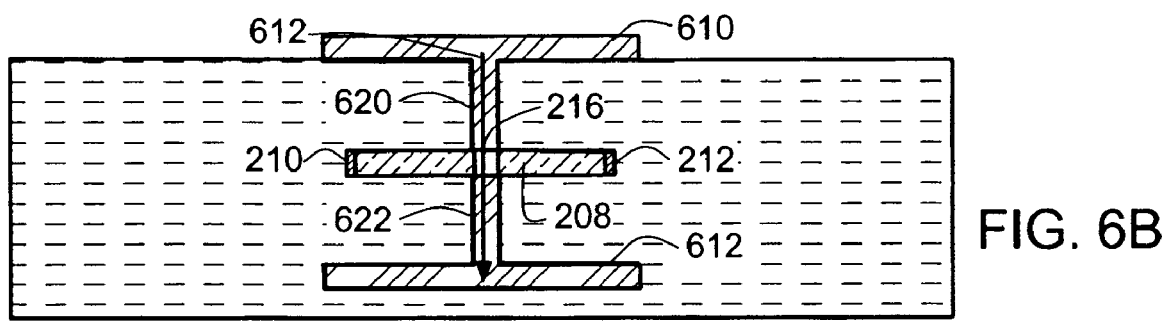
Figure 6C:
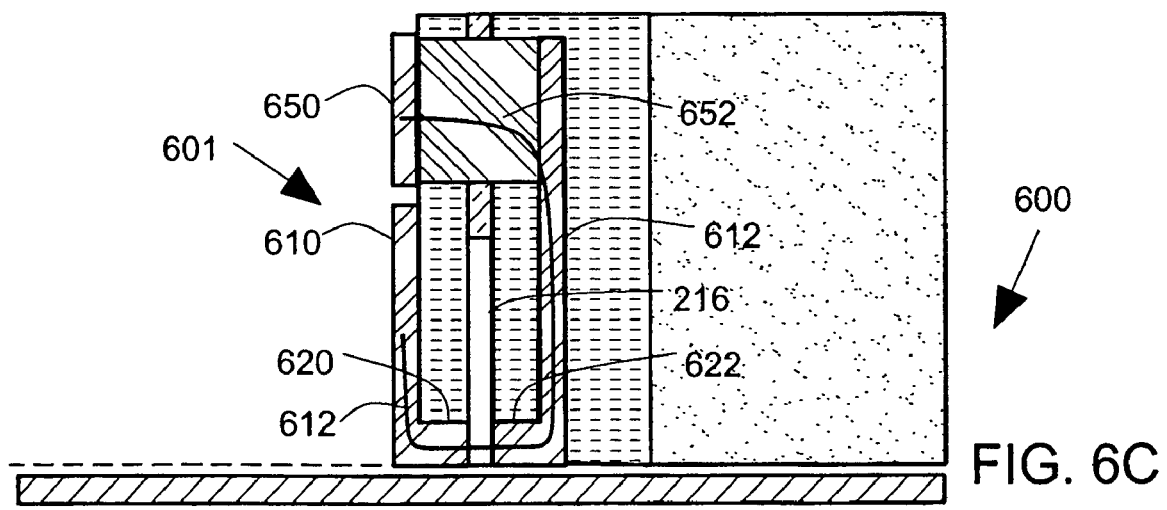

FIGS. 6A, 6B, 6C illustrate a fourth embodiment of a write transducer 601. The write transducer 601 includes a plasmon resonator 200 similar to the plasmon resonator 200 illustrated in FIGS. 2A-2B. Reference numbers used in FIGS. 6A, 6B, 6C that are the same as reference numbers used in FIGS. 3A, 3B, 3C refer to the same or similar features. FIG. 6A illustrates a front view. FIG. 6B illustrates a bottom cross-sectional view generally along line 6B-6B' in FIG. 6A. FIG. 6C illustrates a side cross-sectional view generally along line 6C-6C' in FIG. 6A.

In the write transducer 601, a write current 612 is conducted directly through the lower end 216. The lower end 216 is an electrical conductor that serves both as a surface for plasmon formation and as a part of the writer. A first electrically conducting layer 610 includes a thinned region 620 that electrically contacts one side of the lower end 216. A second electrically conducting layer 612 includes a thinned region 622 that electrically contacts an opposite side of the lower end 216. A region of maximum magnetic field strength 630 is directly under the lower end 216. This arrangement is referred to as a current-perpendicular-to-the-plane WAMR (CPP-WAMR) field delivery with a SIMP light delivery system. Since the "wire" (including thinned regions 620, 622) is made with a very small height (distance from the ABS to the back edge of the wire), it has a minimal effect on the plasmon in the pin. The magnetic field from this CPP-WAMR can be a cross-track field in longitudinal media and can write a cross-track dibit in perpendicular recording. In other respects, a data writing system 600 in FIG. 6C is similar to the data writing system 300.

The optically dead region 230 is used to position an electrical lead 652 without interfering with the SIMP light delivery system. A contact pad 650 provides a connection between an external circuit (not illustrated) and the electrical lead 652.

Figure 7A:
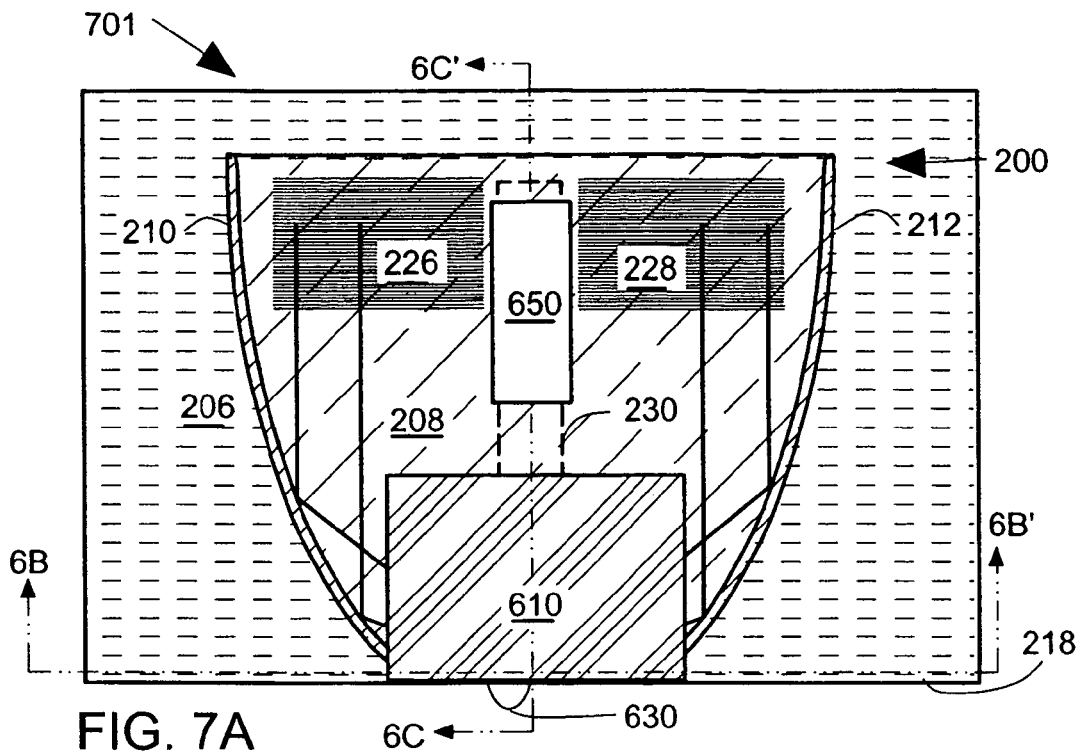
FIGS. 7A, 7B, 7C illustrate a fifth embodiment of a data writing system that includes a plasmon resonator.
Figure 7B:
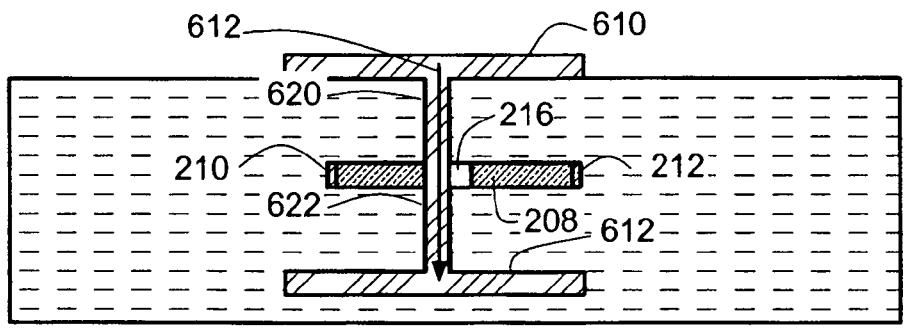
Figure 7C:
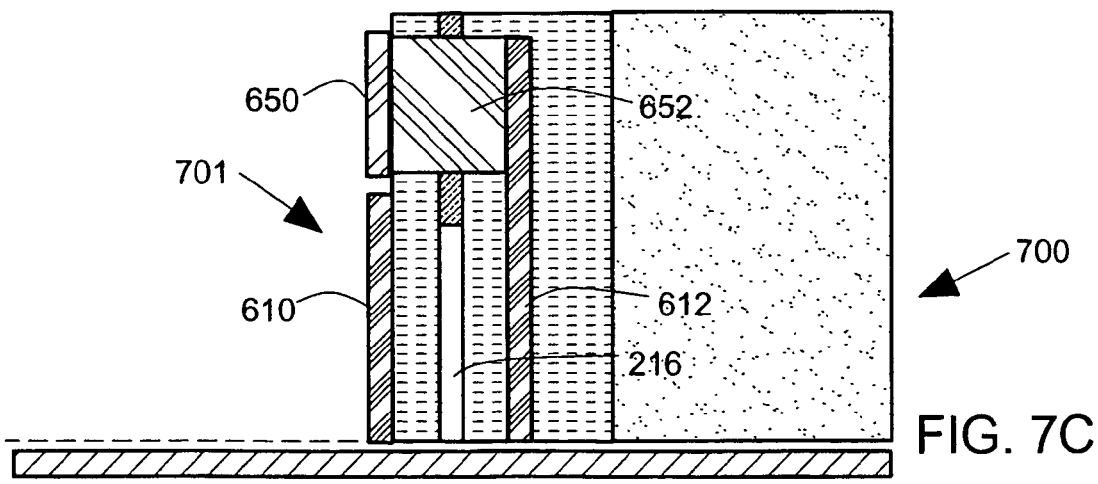

FIGS. 7A, 7B, 7C illustrate a fifth embodiment of a write transducer 701 that includes a plasmon resonator 200. The write transducer 701 is similar to the write transducer 601, except that the write current passes alongside the lower end 216 instead of passing through the lower end 216. In other respects, a data writing system 700 is similar to the data writing system 600.

The writer (joined together thinned regions 620, 622 shown in FIG. 7B) forms an electrical conductor or "wire" that blocks radiation from one side of the lower end 216, which decreases the power delivered to the media, but it can also advantageously decrease the spot size. In an alternative embodiment, a deposit of high moment material (HMM) could also be placed between the wire and the pin, which would enhance the field even further (not illustrated).

Figure 8A:
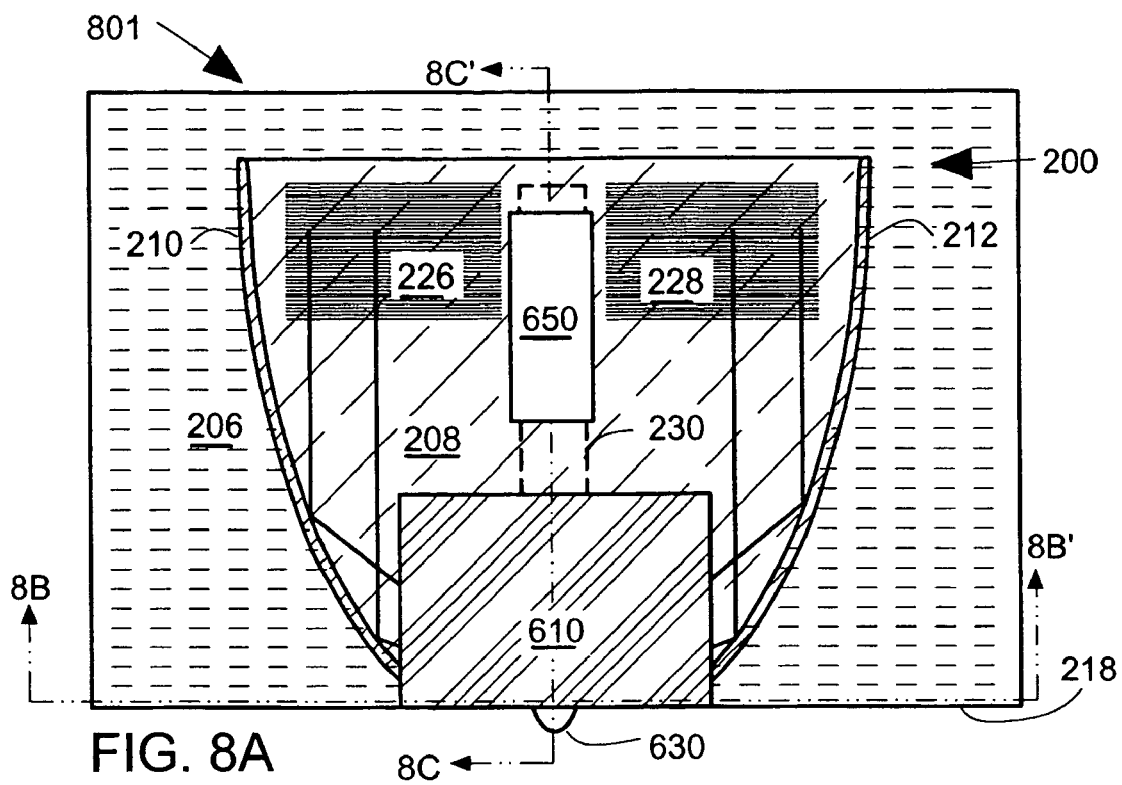
FIGS. 8A, 8B, 8C illustrate a sixth embodiment of a data writing system that includes a plasmon resonator.
Figure 8B:
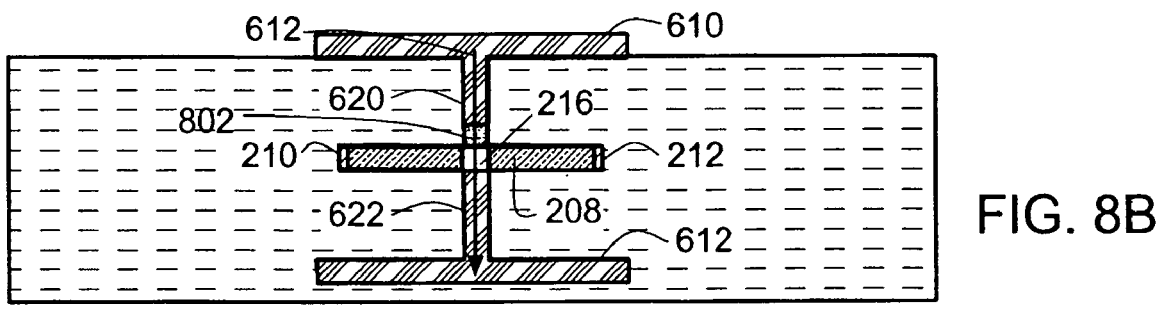
Figure 8C:
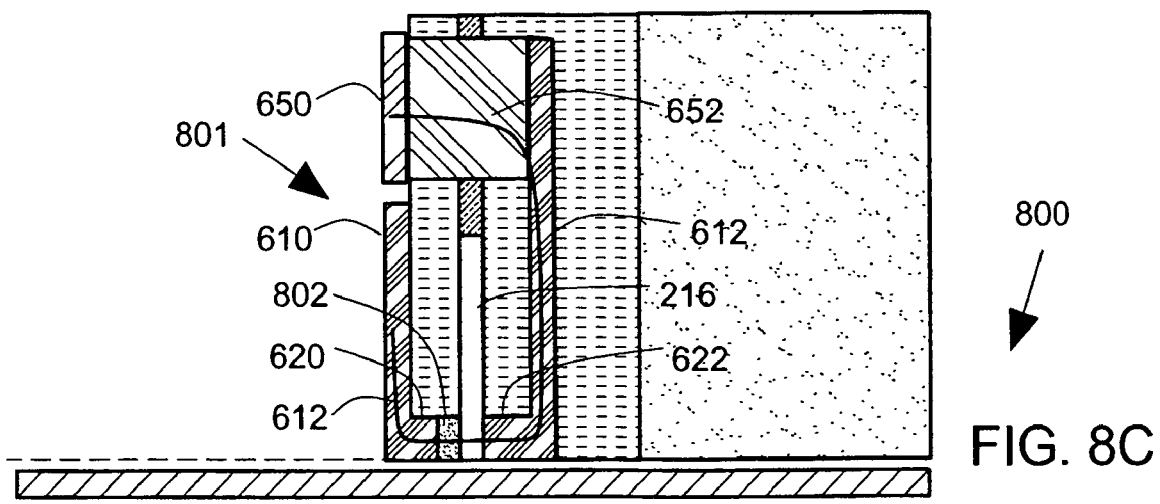

FIGS. 8A, 8B, 8C illustrate a sixth embodiment of a write transducer 801 that includes a plasmon resonator 200. The write transducer 801 is similar to the write transducer 601, except that a STAR writer 802 is included adjacent the lower end 216. The STAR field delivery works by sending a current through a spin-valve like device (a pinned layer and a free layer) in the CPP direction. At large current densities, the current induces a rotation or switching of the free layer and the field from the free layer can be used to write to the media. The STAR device 802 is an electrical conductor that serves as a writer. The star writer 802 is very compact and can be integrated easily with the SIMP to provide a highly focused write magnetic field. Additional layers or structures (not illustrated) may be used to bias a free layer in the STAR device to be perpendicular to the bearing surface when the head is not writing.

Figure 9A:
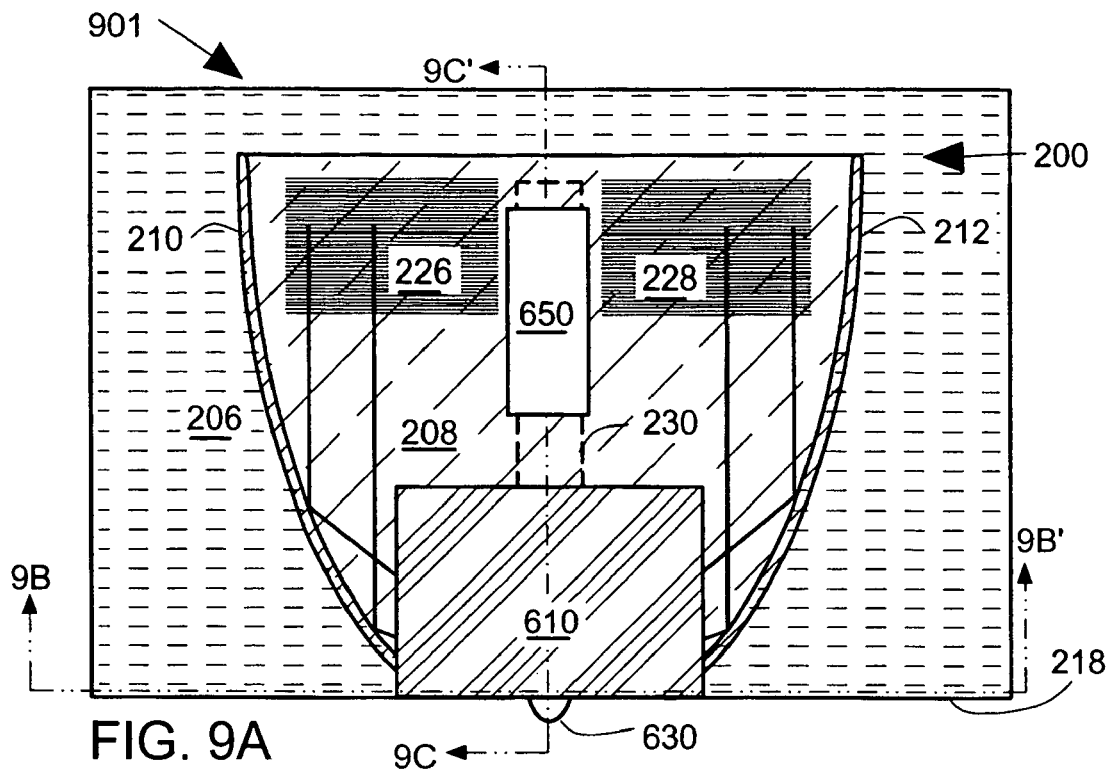
FIGS. 9A, 9B, 9C illustrate a seventh embodiment of a data writing system that includes a plasmon resonator.
Figure 9B:
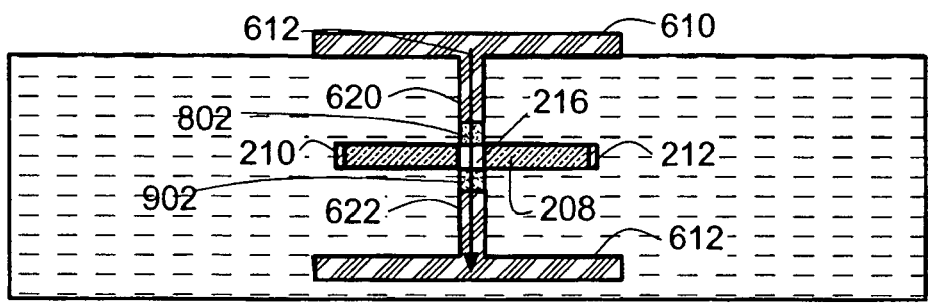
Figure 9C:
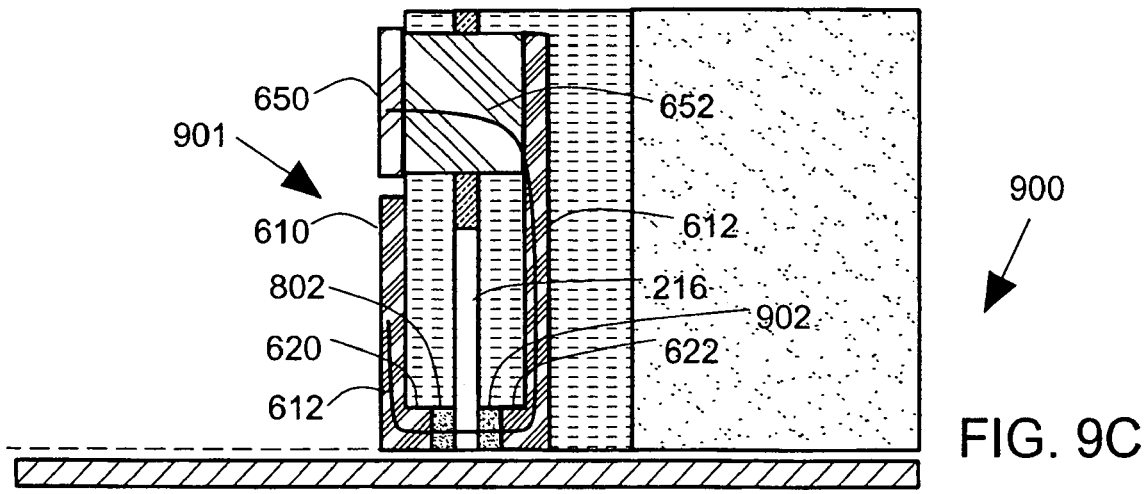

FIGS. 9A, 9B, 9C illustrate a seventh embodiment of a write transducer 901 that includes a plasmon resonator 200. The write transducer 901 is similar to the write transducer 801, except that a second STAR writer 902 has been added. The star writers 802, 902 are electrical conductors that carry a write current 612. In other respects, a data writing system 900 shown in FIG. 9C is similar to the data writing system 800 shown in FIG. 8C.

Figure 10A:
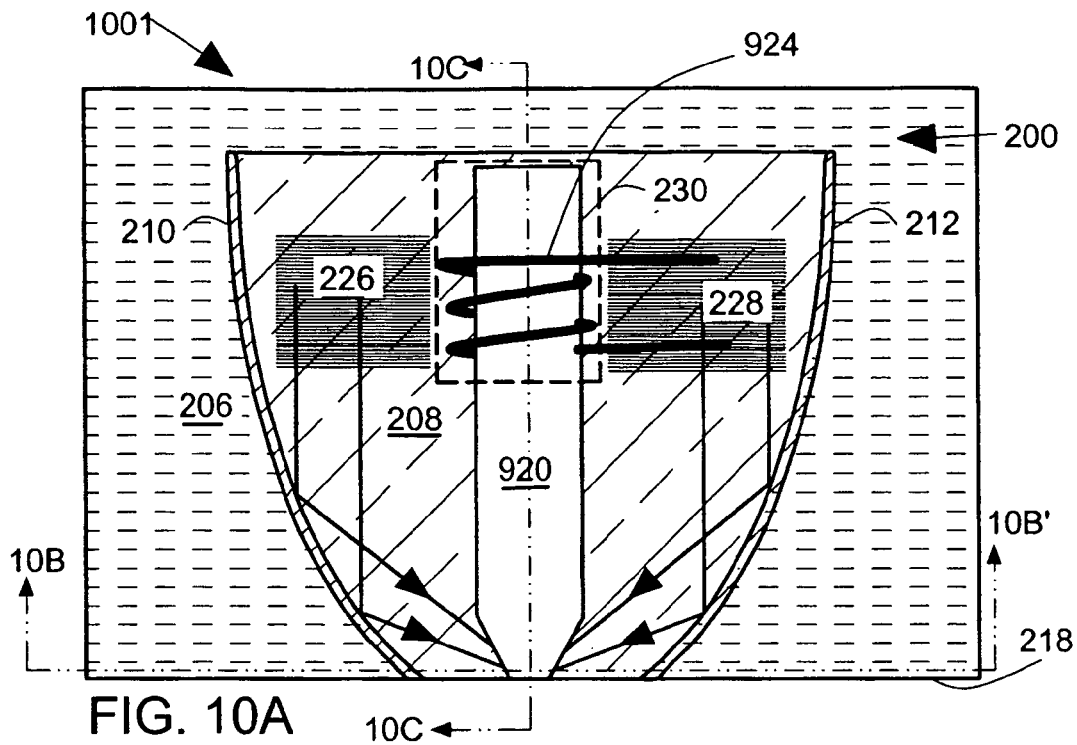
FIGS. 10A, 10B, 10C illustrate an eighth embodiment of a data writing system that includes a plasmon resonator.
Figure 10B:
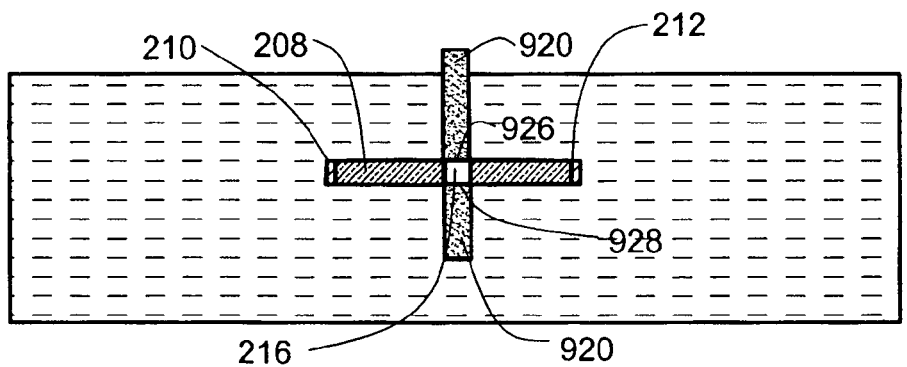
Figure 10C:
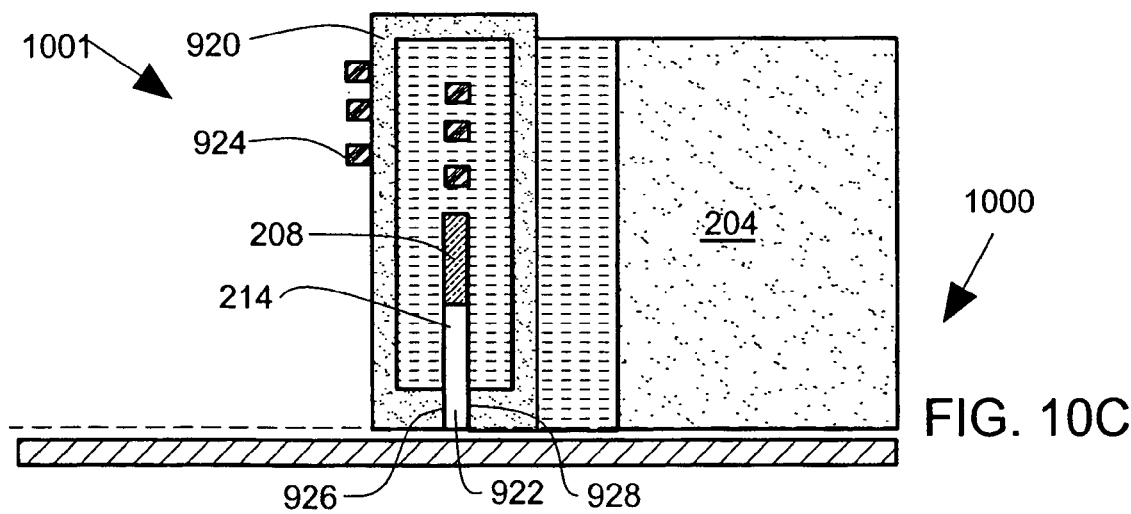

FIGS. 10A, 10B, 10C illustrate an eighth embodiment of a write transducer 1001 that includes a plasmon resonator 200 similar to the plasmon resonators illustrated in FIGS. 2A, 2B. The write transducer 1001 includes a write core 920 with a write gap 922. The write core 920 is arranged generally perpendicular to the bearing surface 218. The lower end 216 is in the write gap 922. A write coil 924 wrapped around an upper end of the write core carries a write current that generates a write magnetic field that is maximal near the lower end 216. The arrangement with the write core 920 and the write coil 924 together comprise a writer. The writer core 920 preferably comprises alloys of iron (Fe), cobalt (Co) and nickel (Ni) such as NiFe, FeCoB and FeCo. In preferred arrangements, the writer core 920 can comprise $Ni_{80}Fe_{20}$, $Ni_{45}Fe_{55}$ or $Fe_{50}Co_{50}$. In other respects, a data writing system 1000 shown in FIG. 10C is similar to the data writing systems of FIGS. 3C-9C.

Pole tips of the write core 920 are shaped so that only the very tips 926, 928 of the poles are in close proximity to the pin. The rest of the write core 920 is far enough from the pin that it does not interfere with the plasmon in the pin. The upper portion of the write core 920 passes through an optically dead region above the pin 214 so that it does not interfere with the light as it propagates through the waveguide. If the wider portion of the pole is far enough from the waveguide so as to not interfere with the light propagating through the waveguide it can be made wide before it gets behind the back of the pin. A dielectric layer can be deposited between the pole and the top cladding layer to move the pole far enough away from the waveguide. This dielectric layer can be formed of the same material as the cladding layer. Alternatively, the pole can be made the same width of the pin until it reaches a point behind the pin where it can then become wider. Keeping the pole close to the pin for the length of the pin will reduce the efficiency of the field delivery. The metal pin 214 passes through a write gap in the write core 920.

Figure 10D:
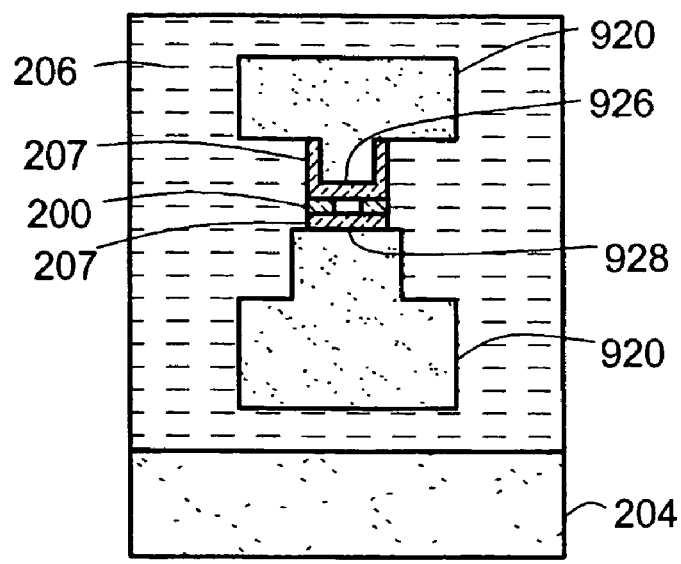
FIGS. 10D, 10E illustrate an alternative arrangement similar to the arrangement illustrated in FIGS. 10A, 10B, 10C.
Figure 10E:
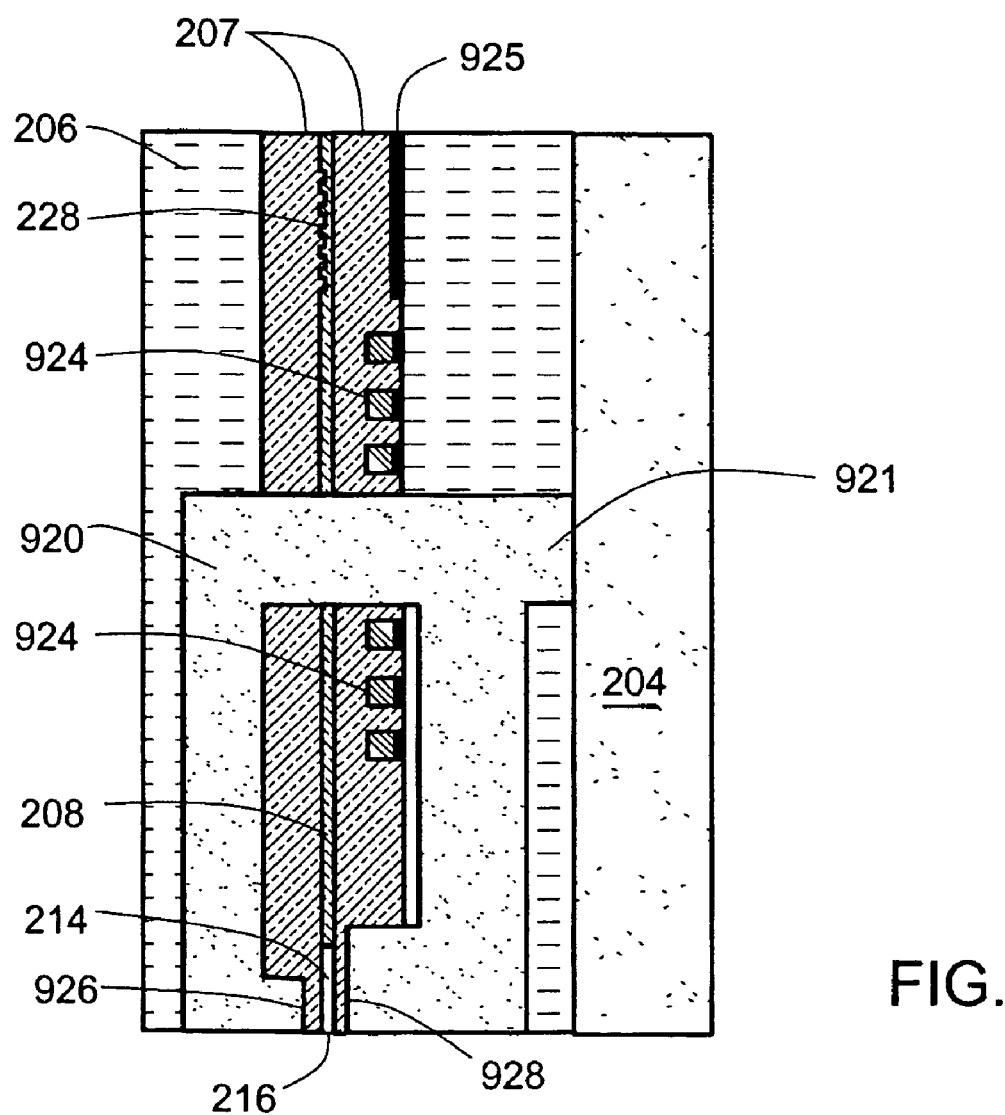

FIGS. 10D, 10E illustrate an alternative arrangement similar to the arrangement illustrated in FIGS. 10A, 10B, 10C. Reference numbers used in FIGS. 10D, 10E that are the same as reference numbers used in FIGS. 10A, 10B, 10C identify the same or similar features. As illustrated in FIG. 10E, the core 924 includes an extension 921 that provides a high thermal conductivity path to the substrate 204 for heat sinking. In FIGS. 10D, 10E, the plasmon resonator 200 is positioned between silicon dioxide layers 207, and the coil 924 is a generally planar coil that is positioned behind the plasmon resonator 200 on a mirror layer 925 rather than passing through the plasmon resonator 200.

Figure 11A:
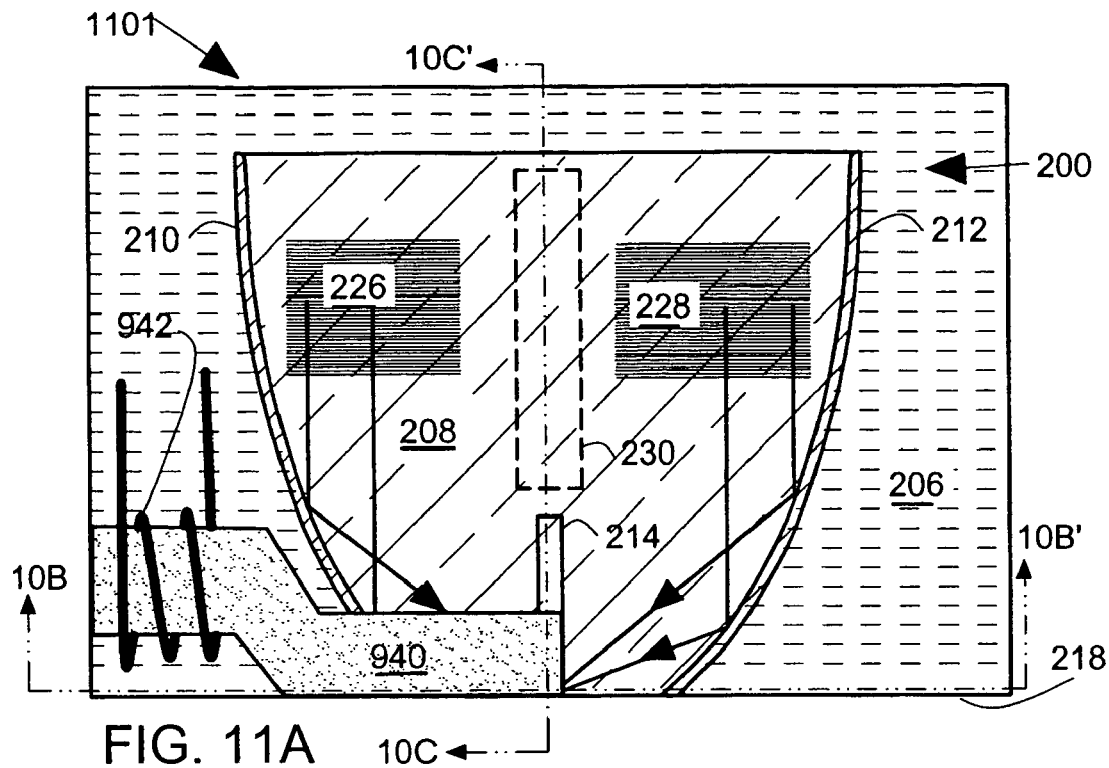
FIGS. 11A, 11B, 11C illustrate a ninth embodiment of a data writing system that includes a plasmon resonator.
Figure 11B:
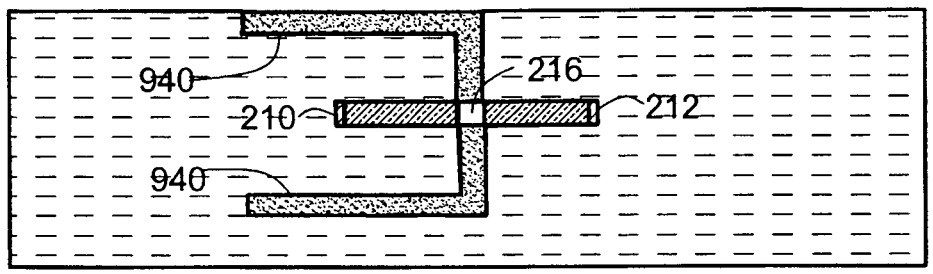
Figure 11C:
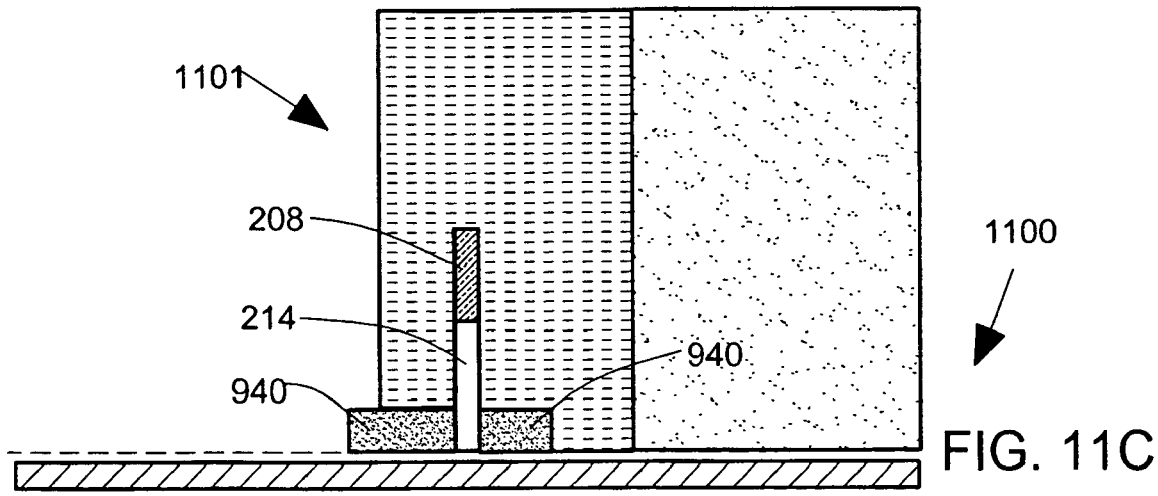

FIGS. 11A, 11B, 11C illustrate a ninth embodiment of a write transducer 1101 that includes a plasmon resonator 200. The arrangement shown in FIGS. 11A, B, C. is similar to the arrangement shown in FIGS. 10A, 10B, 10C, except that a write core 940 and a coil 942 are positioned horizontally on the side of the SIMP instead of vertically as shown in FIGS. 10A, 10B, 10C. The write core 940 is arranged generally parallel to and alongside the bearing surface 218. The metal pin 214 passes through a write gap in the write core 940. In other respects, a data writing system 1100 shown in FIG. 11C is similar to the data writing system 1000 shown in FIG. 10C.

Figure 12:
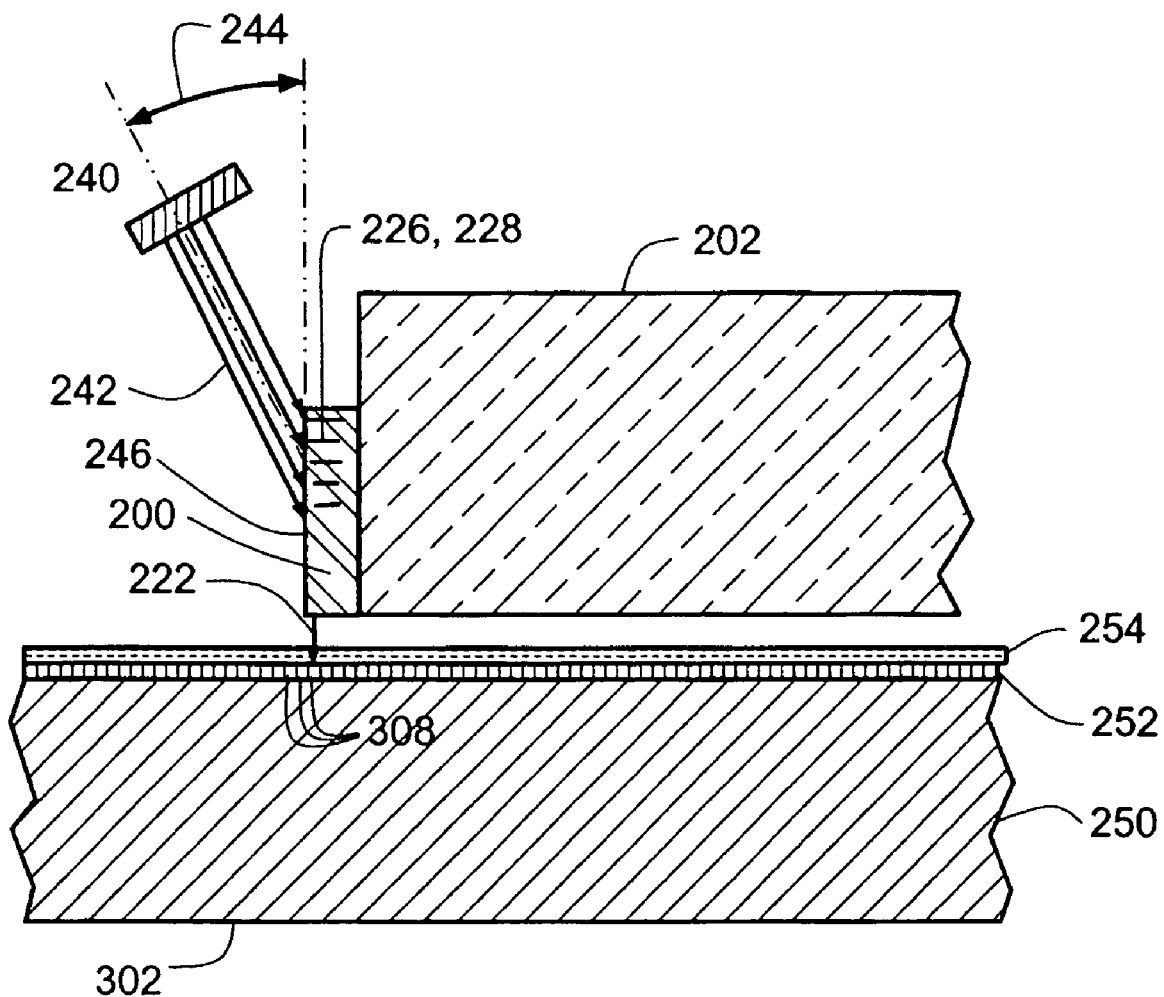
FIG. 12 illustrates oblique illumination of gratings in a plasmon resonator.

FIG. 12 illustrates oblique illumination of gratings 226, 228 in the plasmon resonator 200 illustrated in FIGS. 2A, 2B. Reference numbers used in FIG. 12 that are the same as reference numbers used in FIGS. 2A, 2B identify the same or similar features. A light source 240 provides illumination 242 to gratings 226, 228 in the plasmon resonator. The illumination 242 strikes the gratings at an angle 244 relative to a front surface 246 of the plasmon resonator. The illumination is preferably collimated radiation. In one preferred embodiment, the light source 240 is a solid state laser diode. In another preferred embodiment, the light source 240 is a waveguide. The grating couples the illumination into the waveguide (220 in FIG. 2A) which is then used in the plasmon resonator 200 as explained above in connection with FIGS. 2A, 2B. Output plasmon radiation 222 is limited to a small spot on disc 302 to provide rapid, precise, localized heating during a write interval. The disc 302 preferably comprises a disc substrate 250, a magnetic media layer 252 and a lubricant layer 254.

Figure 13:
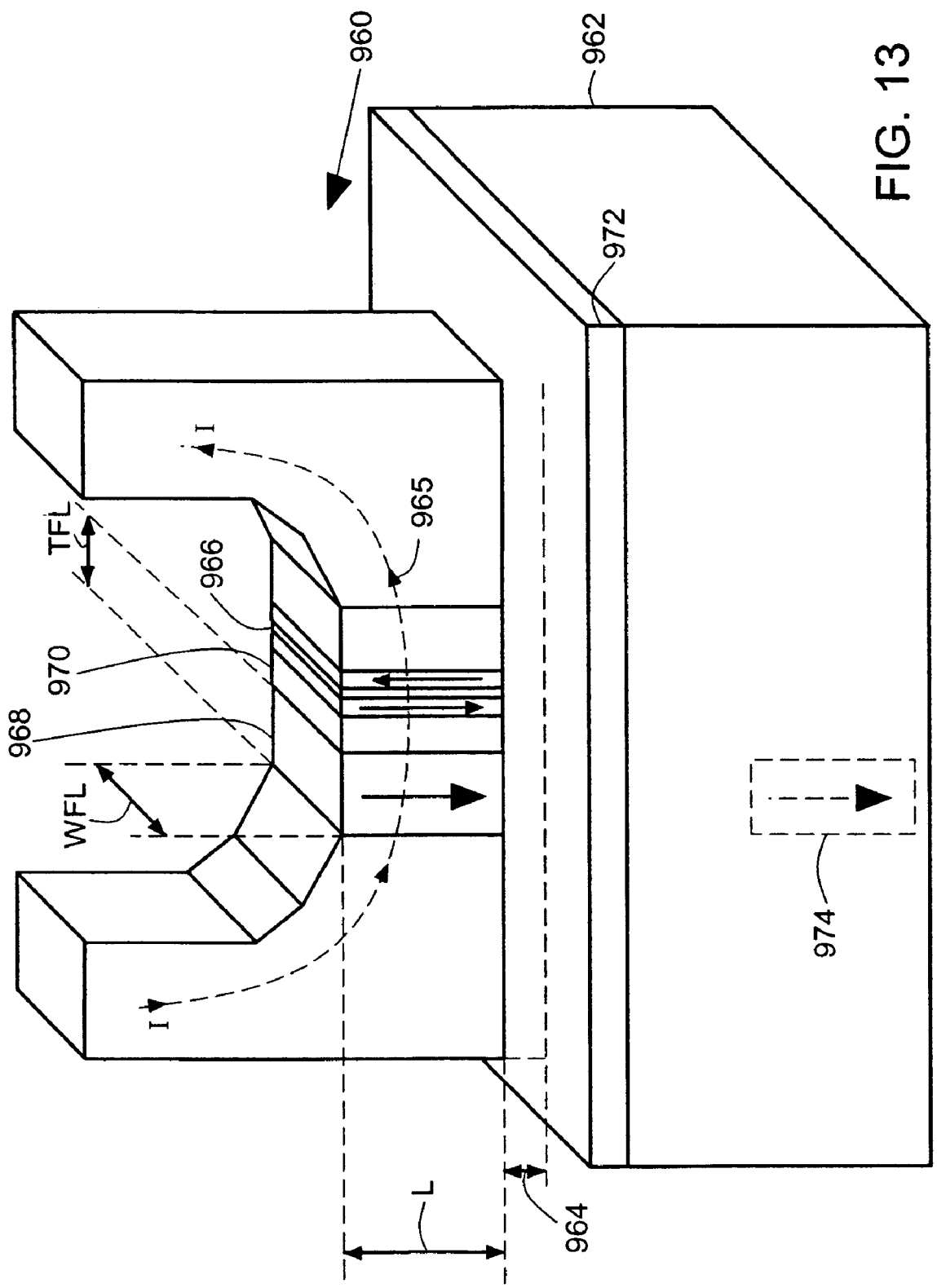
FIG. 13 illustrates an embodiment of a writer.

FIG. 13 illustrates an embodiment of a STAR writer 960 spaced apart from a magnetic media layer 972 by nonmagnetic gap 964 that includes air as well as lubricant and overcoat. The STAR writer 960 comprises a stack of alternating layers of magnetic and non-magnetic material and is structurally very similar to the current-perpendicular-to-the-plane (CPP) giant magnetoresistance (GMR) read heads. Each of the layers in the stack is electrically conductive and a current I at 965 passes through the stack during a read operation. A pinned layer (PL) 966 has a fixed magnetization that is oriented either towards or away from the media. The pinned layer 966 preferably comprises a pinned synthetic antiferromagnet (SAF), although other hard and/or pinned layer configurations can be used as long as the PL magnetization is fixed.

The pinned layer 966 is separated from a soft ferromagnetic free layer (FL) 968 by a non-magnetic spacer layer 970. The free layer 968 has a free layer width WFL, a free layer thickness TFL and a free layer height L as illustrated. The non-magnetic spacer layer 970 preserves the spin-polarization of the conduction electrons that diffuse between the pinned layer 966 and the free layer 968. The non-magnetic spacer layer 970 can comprise metals such as copper, silver or gold. Preferably the thickness and material of the non-magnetic spacer layer 970 are selected such that the Ruderman-Kittel-Kasuya-Yoshida (RKKY) interlayer coupling energy is negligible, however, this is not required. The quiescent state of the device has magnetization of the free layer 968 aligned parallel to the surface of the magnetic media layer 972 and orthogonal to the pinned layer 966. The device operates by rotating the magnetization of the free layer 968 between parallel and antiparallel configurations with respect to that of the pinned layer 966 through the application of a spin-polarized CPP electron current. The fringe field from the free layer 968 is used to record bits in a hard magnetic media layer. An image 974 is formed of the free layer 968 in the soft underlayer 962 opposite the free layer 968.

The magnetization rotation is not caused by the magnetic fields generated from the electrical current, as is the case for a conventional writer and as has been observed in CPP GMR sensors with large cross-sectional area. The mechanism originates from the transfer of angular momentum from spin-polarized conduction electrons to a ferromagnetic layer and the consequent torque exerted by this "spin-transfer".

In summary, a data writing system (such as 300) comprises a medium (such as 302) including an array of cells (such as 308) for storing data. The data writing system also includes a write transducer (such as 301) that is moveable relative to the medium to provide a movement of the write transducer over a selected cell in the array. The write transducer comprises a writer (such as 318) producing a write magnetic field (such as 320) that intersects the selected cell. The writer also comprises a plasmon resonator (such as 200). The plasmon resonator is adjacent the writer and is shaped to receive lower power density radiation and to provide plasmon radiation at a higher power density to an optical spot. The optical spot intersects with the selected cell. The plasmon radiation heats the selected cell above a write temperature. The writer can comprise an electrical conductor adjacent the bearing surface (such as 218) for carrying a write current The writer can alternatively comprise a write coil (such as 924) and a write core (such as 920) that includes a write gap, and the plasmon resonator includes a pin (such as 216) that passes through the write gap.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data writing system while maintaining substantially the same functionality without departing from the scope of the present invention. The data writing system can be combined with a data reader. If a magnetic material is suitable for use as the pin material, the pin itself could be made of this magnetic material and be part of the write structure. The pin could be the write pole that is energized using a standard coil, WAMR or STAR. In addition, although a preferred embodiment described herein is directed to a disc drive system in which both a disc and a head move to provide relative motion, it will be appreciated by those skilled in the art that the teachings of the present invention can be applied to other movement arrangements that may move only the media or only the write transducer without departing from the scope of the present invention.

What is claimed is:

1. A data writing system, comprising:
   a medium including an array of cells for storing data; and
   a write transducer that is moveable relative to the medium to provide a movement of a bearing surface of the write transducer over a selected cell in the array, the write transducer comprising:
      a plasmon resonator that is shaped to receive lower power density radiation and to provide plasmon radiation at a higher power density to an optical spot that is under a lower end of a pin in the plasmon resonator and that is intersecting with the selected cell, the plasmon radiation heating the selected cell above a write temperature; and
      a writer including an electrical conductor having an electrical conductor portion that carries a write current and that is at the bearing surface and that overlies the lower end of the pin for carrying the write current next to the lower end of the pin, the write current next to the lower end of the pin producing a write magnetic field that intersects the selected cell.

2. The data writing system of claim 1 wherein the electrical conductor portion comprises a thinned region.

3. The data writing system of claim 2 wherein the electrical conductor portion comprises a current-in-the-plane current element.

4. The data writing system of claim 3 wherein the writer further comprises a deposit of high magnetic moment material next to the electrical conductor portion.

5. The data writing system of claim 1 wherein the electrical conductor portion comprises multiple current-in-the-plane elements.

6. The data writing system of claim 1 wherein the write current passes through the lower end of the pin.

7. The data writing system of claim 1 wherein the electrical conductor passes alongside the lower end of the pin.

8. The data writing system of claim 1 wherein the writer further comprises a spin transfer assisted recording (STAR) writer.

9. The data writing system of claim 1 wherein the writer further comprises a plurality of spin transfer assisted recording (STAR) writers.

10. The data writing system of claim 1 wherein the plasmon resonator comprises an optically dead region and the writer includes an electrical lead that passes through the optically dead region.

11. A write transducer that is moveable relative to a medium to provide a movement of a bearing surface of the write transducer over a selected cell in an array in the medium, the write transducer comprising:
    a plasmon resonator that is shaped to receive lower power density radiation and to provide plasmon radiation at a higher power density to an optical spot that is under a lower end of a pin in the plasmon resonator and that is intersecting with the selected cell, the plasmon radiation heating the selected cell above a write temperature; and
    a writer including an electrical conductor having an electrical conductor portion that carries a write current and that is at the bearing surface and that overlies the lower end of the pin for carrying the write current next to the lower end of the pin, the write current next to the lower end of the pin producing a write magnetic field that intersects the selected cell.

12. The write transducer of claim 11 wherein the electrical conductor portion comprises a thinned region.

13. The write transducer of claim 11 wherein the writer further comprises a deposit of high magnetic moment material next to the electrical conductor portion.

14. The write transducer of claim 11 wherein the electrical conductor portion passes through the plasmon resonator.

15. The write transducer of claim 11 wherein the electrical conductor portion passes alongside the plasmon resonator.

16. The write transducer of claim 11 wherein the writer further comprises a spin transfer assisted recording (STAR) writer.

* * * * *